United States Patent
Ito et al.

(10) Patent No.: US 9,430,631 B2
(45) Date of Patent: Aug. 30, 2016

(54) CONNECTION CONTROL DEVICE ESTABLISHING CONNECTION BETWEEN PORTABLE TYPE MOBILE TERMINAL AND INFORMATION PROCESSING DEVICE BY WIRELESS COMMUNICATION

(75) Inventors: Hiroyasu Ito, Okazaki (JP); Takumi Kaseda, Ota-ku (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 972 days.

(21) Appl. No.: 13/523,222

(22) Filed: Jun. 14, 2012

(65) Prior Publication Data

US 2012/0322461 A1    Dec. 20, 2012

(30) Foreign Application Priority Data

Jun. 16, 2011 (JP) ................................ 2011-134351
Apr. 9, 2012 (JP) ................................ 2012-088700

(51) Int. Cl.
*H04W 4/02* (2009.01)
*H04M 3/00* (2006.01)
(Continued)

(52) U.S. Cl.
CPC ............... *G06F 21/35* (2013.01); *G06F 3/017* (2013.01); *G06F 3/04883* (2013.01); *H04W 4/027* (2013.01); *H04L 67/12* (2013.01); *H04W 76/02* (2013.01)

(58) Field of Classification Search
CPC ............ H04N 1/00204; G06F 21/35; G06F 3/04883; G06F 3/017; G06F 3/1292; G06F 15/00; G06F 3/1205; G06F 21/20; H04W 4/027; H04W 76/02; H04W 4/02; H04W 92/18; H04L 67/12; G01S 5/06

USPC .......... 455/41.3, 3.06, 410, 411, 412, 414.1, 455/456.1–456.6; 358/1.13–1.16, 1.9, 501, 358/505
See application file for complete search history.

(56) References Cited

U.S. PATENT DOCUMENTS 8,310,449 B1 * 11/2012 Butikofer ............ G06F 3/04895
                                                    345/168
8,878,834 B2 * 11/2014 Matsumoto ........ H04N 1/00307
                                                    345/418

(Continued)

FOREIGN PATENT DOCUMENTS

CN       101437100    5/2009
JP       2001-223779 A    8/2001

(Continued)

OTHER PUBLICATIONS

Office Action and Search Report issued in corresponding Chinese Patent Application No. 201210194435.5, mailed Jul. 2, 2014 and English translation.

(Continued)

*Primary Examiner* — Khawar Iqbal
(74) *Attorney, Agent, or Firm* — Buchanan Ingersoll & Rooney PC

(57) ABSTRACT

A connection control device acquires information on a position in which a user performs manipulation input to information processing device and information on a travel distance of a portable type mobile terminal. The connection control device compares the acquired pieces of information to determine whether the manipulation input performed by the user corresponds to a travel of the portable type mobile terminal. The connection control device establishes a wireless connection between the information processing device and the portable type mobile terminal according to a determination result.

32 Claims, 28 Drawing Sheets

(51) Int. Cl.
*G06F 21/35* (2013.01)
*G06F 3/0488* (2013.01)
*G06F 3/01* (2006.01)
*H04L 29/08* (2006.01)
*H04W 76/02* (2009.01)

(56) References Cited

U.S. PATENT DOCUMENTS

| | | | |
|---|---|---|---|
| 9,176,543 B2* | 11/2015 | Faith | G06F 1/1694 |
| 2002/0036618 A1 | 3/2002 | Wakai et al. | |
| 2003/0122804 A1 | 7/2003 | Yamazaki et al. | |
| 2007/0149124 A1* | 6/2007 | Onozawa | H04B 5/0062 |
| | | | 455/41.2 |
| 2007/0223476 A1 | 9/2007 | Fry | |
| 2008/0186536 A1 | 8/2008 | Shimizu | |
| 2009/0122343 A1 | 5/2009 | Nishitani | |
| 2009/0207445 A1* | 8/2009 | Kimura | H04N 1/00307 |
| | | | 358/1.15 |
| 2010/0060929 A1* | 3/2010 | Koizumi | G06F 3/1205 |
| | | | 358/1.15 |
| 2010/0225962 A1* | 9/2010 | Okigami | H04L 63/0492 |
| | | | 358/1.15 |
| 2011/0085204 A1* | 4/2011 | Hamada | H04N 1/387 |
| | | | 358/1.15 |
| 2011/0169969 A1* | 7/2011 | Matsuda | H04N 1/00204 |
| | | | 348/207.2 |
| 2011/0216349 A1* | 9/2011 | McCorkindale | G06F 15/00 |
| | | | 358/1.15 |
| 2011/0312279 A1* | 12/2011 | Tsai | G01S 11/02 |
| | | | 455/67.11 |
| 2013/0141747 A1* | 6/2013 | Oba | G06F 3/1292 |
| | | | 358/1.14 |
| 2014/0087770 A1* | 3/2014 | Cho | H04W 4/02 |
| | | | 455/457 |

FOREIGN PATENT DOCUMENTS

| | | | |
|---|---|---|---|
| JP | 2001-290585 A | 10/2001 | |
| JP | 2003-345492 A | 12/2003 | |
| JP | 2005-223636 A | 8/2005 | |
| JP | 2008-027220 A | 2/2008 | |
| JP | 2008-193265 | 8/2008 | |
| JP | 2008-193265 A | 8/2008 | |
| JP | 2009-224935 A | 10/2009 | |
| JP | 2010-056642 A | 3/2010 | |
| JP | 2010-161654 A | 7/2010 | |
| JP | 2010-183306 A | 8/2010 | |
| JP | 2010-056642 | * 11/2010 | H04M 3/00 |

OTHER PUBLICATIONS

Office Action (Notification of Reasons for Refusal) issued on Dec. 9, 2014, by the Japan Patent Office in corresponding Japanese Patent Application No. 2012-088700, and an English Translation of the Office Action. (9 pages).

Extended European Search Report issued on Jul. 27, 2015, by the European Patent Office in corresponding European Patent Application No. 12171777.1-1853. (8 pages).

Holmquist, et al., "Smart-Its Friends: A Technique for Users to Easily Establish Connections between Smart Artefacts," 2001, pp. 1-7.

* cited by examiner

FIG.8

PORTABLE TERMINAL TRAVEL LOG

| TRAVEL LOG No. | TRAVEL START CLOCK TIME | TERMINAL ID | TRAVEL TIME (SEC) | TRAVEL DISTANCE TOTAL (mm) | TRAVEL DISTANCE X (mm) | TRAVEL DISTANCE Y (mm) | TRAVEL DISTANCE Z (mm) | TERMINAL POSITION (NORTH LATITUDE) | TERMINAL POSITION (EAST LONGITUDE) |
|---|---|---|---|---|---|---|---|---|---|
| ... | | | | | | | | | |
| 233 | 2011/2/17 13:04:21 | ABC0024 | 0.7 | 40 | 0 | 40 | 0 | 34.89267 | 137.25500 |
| 234 | 2011/2/17 13:04:21 | ABC0024 | 0.3 | 30 | 30 | 0 | 0 | 34.89267 | 137.25500 |
| 235 | 2011/2/17 13:04:21 | ABC0024 | 0.3 | 50 | -30 | -40 | 0 | 34.89267 | 137.25500 |
| 236 | 2011/2/17 13:02:01 | ABC0022 | 0.6 | 12 | 10 | 5 | 0 | 34.84212 | 137.34133 |
| 237 | 2011/2/17 13:04:22 | ABC0001 | 0.5 | 50 | 50 | 0 | 0 | 34.84183 | 137.34256 |
| 238 | 2011/2/17 13:04:22 | ABC0022 | 0.3 | 23 | 20 | 10 | 0 | 34.84212 | 137.34133 |
| 239 | 2011/2/17 13:04:22 | ABC0022 | 0.3 | 45 | 40 | 20 | 0 | 34.84212 | 137.34133 |
| 240 | 2011/2/17 13:04:23 | ABC0001 | 0.7 | 40 | 0 | 40 | 0 | 34.84183 | 137.34256 |
| 241 | 2011/2/17 13:04:23 | ABC0022 | 0.7 | 40 | -40 | 0 | 0 | 34.84212 | 137.34133 |
| 242 | 2011/2/17 13:04:44 | ABC0001 | 0.3 | 50 | -50 | 0 | 0 | 34.84183 | 137.34256 |
| | | | | | | | | | |

FIG.11

INFORMATION TERMINAL MANIPULATION POSITION TRAVEL LOG

| MANIPULATION LOG No. | MANIPULATION START CLOCK TIME | TERMINAL ID | TRAVEL TIME (SEC) | TRAVEL DISTANCE TOTAL (mm) | TRAVEL DISTANCE X (mm) | TRAVEL DISTANCE Y (mm) | TRAVEL DISTANCE Z (mm) | TERMINAL POSITION (NORTH LATITUDE) | TERMINAL POSITION (EAST LONGITUDE) |
|---|---|---|---|---|---|---|---|---|---|
| 1 | 2011/2/17 13:04:22 | MFP001 | 0.5 | 50 | 50 | 0 | — | 34.84183 | 137.34256 |
| 2 | 2011/2/17 13:04:23 | MFP001 | 0.7 | 40 | 0 | 40 | — | 34.84183 | 137.34256 |
| 3 | 2011/2/17 13:04:44 | MFP001 | 0.3 | 50 | -50 | 0 | — | 34.84183 | 137.34256 |
|  |  |  |  |  |  |  |  |  |  |
|  |  |  |  |  |  |  |  |  |  |

CONNECTION CONTROL DEVICE ESTABLISHING CONNECTION BETWEEN PORTABLE TYPE MOBILE TERMINAL AND INFORMATION PROCESSING DEVICE BY WIRELESS COMMUNICATION

This application is based on Japanese Patent Application No. 2011-134351 filed with the Japan Patent Office on Jun. 16, 2011 and Japanese Patent Application No. 2012-88700 filed with the Japan Patent Office on Apr. 9, 2012, the entire content of which is hereby incorporated by reference.

BACKGROUND OF THE INVENTION

1. Field of the Invention

The present invention relates to a connection control device, an information processing device, an image forming device, a portable type mobile terminal, and an information processing system, particularly to a connection control device that is used in an information processing system that conducts wireless communication between a portable type mobile terminal and an information processing device, the information processing device, an image forming device, the portable type mobile terminal, and the information processing system.

2. Description of the Related Art

Conventionally, in an information processing system including an information processing device that inputs and outputs information and a portable type mobile terminal, such as a mobile phone, a connection is established by wireless communication between the information processing device and the portable type mobile terminal to transfer data. An image forming device (such as an MFP (Multi Function Peripheral) provided with a scanner function, a facsimile function, a copying function, a function as a printer, a data communication function and a server function, a facsimile machine, a copying machine, and a printer) can be cited as an example of the information processing device.

As to the function, which is performed in the information processing system while the connection is established by wireless communication, for example, the image forming device performs print based on data transferred from a mobile phone terminal. In the function, a file (such as a document file in a PDF (Portable Document Format) format) in the mobile phone terminal is transferred to the image forming device. For example, the file is transferred after the connection between the mobile phone terminal and the image forming device is established through a wireless interface, such as Bluetooth (registered trademark).

Document 1 discloses an image processing system that can start wireless communication between a portable information terminal and an image processing device to automatically perform various pieces of processing. In the image processing system, the portable information terminal is located within a range, where the portable information terminal can conduct near-field wireless communication with the image processing device, to start the wireless communication between the portable information terminal and the image processing device.

Document 2 discloses an image forming device that performs a body area network with a portable terminal possessed by a user. Through the body area network, the image forming device performs a user authentication to the portable terminal, and the portable terminal performs a user authentication to the image forming device.

Document 3 discloses a portable electronic instrument including an acceleration sensor, the portable electronic instrument performing a predetermined function, such as switching of a screen display mode, according to a direction in which an instrument body is shaken when a user shakes the portable electronic instrument.

Document 4 discloses a mobile phone including a three-dimensional motion sensor. When the user who holds the mobile phone with user's hand performs a motion gesture, the mobile phone checks data sensed by the three-dimensional motion sensor against personal handwriting data.

[Document 1] Japanese Patent Publication Laying-Open No. 2008-193265
[Document 2] Japanese Patent Publication Laying-Open No. 2010-183306
[Document 3] Japanese Patent Publication Laying-Open No. 2003-345492
[Document 4] Japanese Patent Publication Laying-Open No. 2001-223779

Conventionally, it is necessary for the user to perform a troublesome manipulation in order that the connection between the portable type mobile terminal and the information processing device is established to conduct wireless communication and in order that the portable type mobile terminal and the information processing device cooperate with each other. For example, it is necessary to previously perform a manipulation to input a passkey to each of the image forming device and the mobile phone terminal in order that the connection between the image forming device and the mobile phone terminal is established (also called pairing) so as to be able to transfer the file by Bluetooth.

That the manipulation performed by the user is required to cause the image forming device and the mobile phone terminal to cooperate with each other is attributed to the following fact. That is, one of the features of the connection by wireless communication is that each of the image forming device and the mobile phone terminal cannot solely determine correlativity with the other side to be connected. This feature is not changed even if the same operator clearly manipulates both the image forming device and the mobile phone terminal. In other words, the image forming device and the mobile phone terminal cannot determine whether the image forming device and the mobile phone terminal can be connected to each other even if the image forming device and the mobile phone terminal are located within a service area where the image forming device and the mobile phone terminal can conduct communication with each other. For example, whether the image forming device and the mobile phone terminal are possessed by the same operator and able to cooperate with each other or the image forming device and the mobile phone terminal are manipulated by different operators and not able to cooperate with each other cannot be distinguished.

The image forming system disclosed in Document 1 conducts near-field wireless communication having a standard different from that of the wireless communication between the instruments connected to each other, thereby acquiring information necessary for the wireless communication to conduct wireless communication between the instruments. However, in order to use the near-field wireless communication, unfortunately it is necessary for the instruments to include a corresponding communication interface.

The image forming device disclosed in Document 2 performs the body area network with the portable terminal possessed by the user. When the body area network is performed instead of the wireless communication, the manipulation can easily be performed. However, in order to perform the body area network, unfortunately it is necessary for the instruments to include a corresponding communication interface.

Document 3 or Document 4 discloses no item relating to the correlation of the plurality of devices described above. That is, Document 3 or Document 4 does not disclose an effective solution to the above problem.

The present invention is devised to solve the above problem, and an object of the invention is to provide a connection control device that can establish the connection between the two instruments to be able to conduct wireless communication by the simple manipulation, an information processing device, an image forming device, a portable type mobile terminal, and an information processing system.

SUMMARY OF THE INVENTION

In order to achieve the above object, according to a first aspect of the present invention, a connection control device includes: a first acquisition unit for acquiring information on a position in which a user performs manipulation input to an information processing device; a second acquisition unit for acquiring information on a travel distance of a portable type mobile terminal; a determination unit for comparing the information acquired by the first acquisition unit and the information acquired by the second acquisition unit to determine whether the manipulation input performed by the user corresponds to a travel of the portable type mobile terminal; and a connection unit for establishing a wireless connection between the information processing device and the portable type mobile terminal according to a determination result of the determination unit.

According to a second aspect of the invention, an information processing device includes: the connection control device of the first aspect; and a communication unit for conducting wireless communication with the portable type mobile terminal when the connection unit establishes the wireless connection to the portable type mobile terminal.

According to a third aspect of the invention, an image forming device includes: the information processing device of the second aspect; and an image forming unit for forming an image on a sheet.

According to a fourth aspect of the invention, a portable type mobile terminal includes: the connection control device of the first aspect; and a communication unit for conducting wireless communication with the information processing device when the connection unit establishes the wireless connection to the information processing device.

According to a fifth aspect of the invention, an information processing system includes: an information processing device; and a portable type mobile terminal, wherein one of the information processing device and the portable type mobile terminal includes the connection control device of the first aspect, and the connection unit establishes the wireless connection between the information processing device and the portable type mobile terminal.

According to a sixth aspect of the invention, an information processing system includes: an information processing device; a portable type mobile terminal; and a server for being able to conduct communication with each of the information processing device and the portable type mobile terminal, wherein the server includes the connection control device of the first aspect, and the connection unit establishes the wireless connection between the information processing device and the portable type mobile terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a view illustrating a recording example of a travel log in a travel log database.

FIG. 11 is a view illustrating a recording example of a manipulation log in a manipulation log database.

DESCRIPTION OF THE PREFERRED EMBODIMENTS

Figure 1:
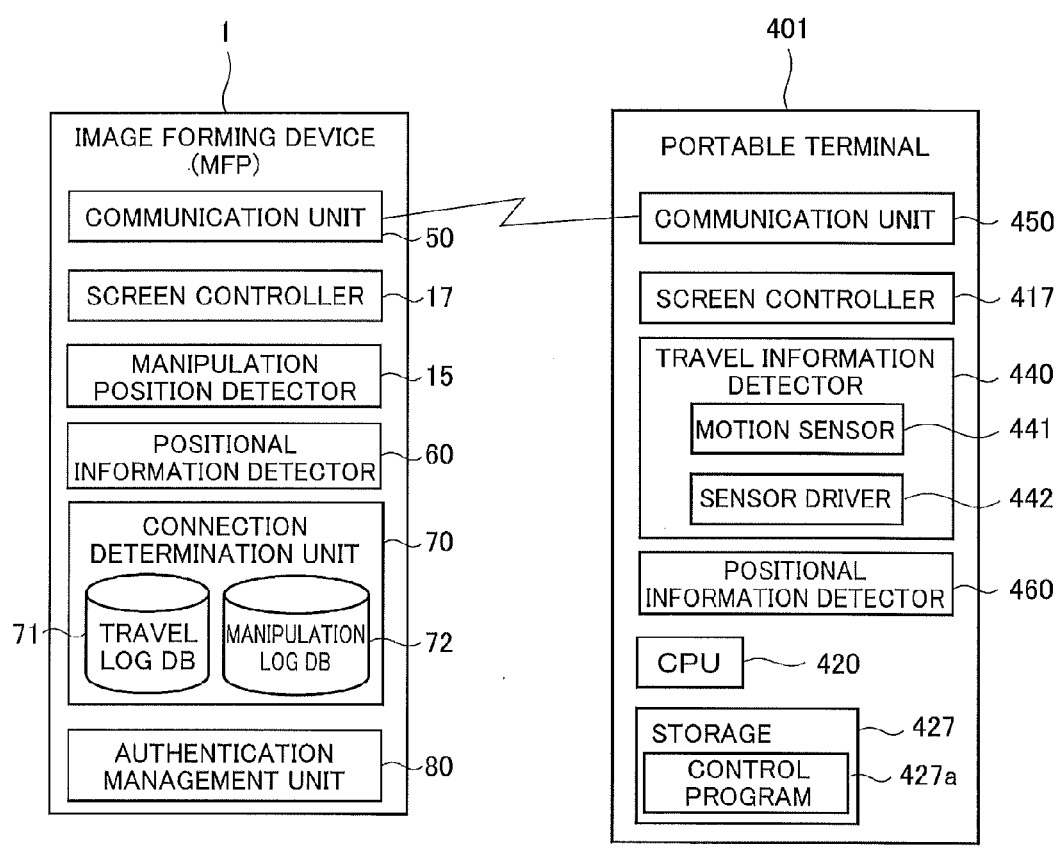
FIG. 1 is a block diagram illustrating an image forming system according to a first embodiment of the invention.

An image forming system (an example of the information processing system) according to an embodiment of the invention will be described below.

The image forming system includes an image forming device (an example of the information processing device) and a portable terminal (an example of the portable type mobile terminal).

The image forming device is a multi-function peripheral (MFP) provided with the scanner function, copying function, function as a printer, facsimile transmitting/receiving function, data communicating function, and server function. With the scanner function, the image forming device reads an image from a document which has been set, and stores the read image in a hard disk drive (HDD) or the like. With the copying function, the device further prints the image on a sheet of paper or the like. With the function as a printer, on receipt of a print instruction from an external terminal such as a personal computer (PC), the device prints an image on a sheet of paper on the basis of the instruction. With the facsimile transmitting/receiving function, the device receives facsimile data from an external facsimile machine or the like and stores the data in a HDD or the like. With the data communicating function, the device transmits data to or receives data from an external device connected thereto. With the server function, the device allows a plurality of users to share, e.g., data stored in a HDD or the like.

For example, the portable terminal is a multifunctional mobile phone including various functions, such as a telephone function, a data communication function, and an information storage, browse, and output function. The telephone function is one that places a telephone call to another telephone through a mobile phone network. For example, the data communication function is one that conducts data communication with another device through the mobile phone network or another network. For example, the data communication function can be implemented by wireless communication. The information storage, browse, and output function is one that stores information transmitted from an external device or the information input from a user, displays the stored information on a display device, and transmits the information to the external device.

The image forming device and the portable terminal can conduct communication with each other using a predetermined wireless communication protocol. While the image forming device and the portable terminal can conduct communication with each other so as to be able to recognize each other, when the user holds the portable terminal to perform a predetermined manipulation, connection is established between the image forming device and the portable terminal. Therefore, the image forming device and the portable terminal are connected so as to be able to conduct data communication with each other. For example, an operation to establish the connection between the image forming device and the portable terminal is performed by the image forming device, the portable terminal, and a connection establishing device provided in one of servers that can conduct communication with the image forming device and the portable terminal.

First Embodiment

FIG. 1 is a block diagram illustrating an image forming system according to a first embodiment of the invention.

In the first embodiment, an image forming system 500 includes an image forming device 1 and a portable terminal 401. In image forming system 500, image forming device 1 acts as a connection establishing device that establishes connection between image forming device 1 and portable terminal 401. In other words, image forming device 1 includes the connection establishing device that establishes the connection between image forming device 1 and portable terminal 401.

[Configuration of Portable Terminal 401]

For example, portable terminal 401 is what is called a smartphone (multifunctional mobile phone). As illustrated in FIG. 1, portable terminal 401 includes a screen controller 417, a CPU 420, a storage 427, a travel information detector 440, a communication unit 450, and a positional information detector 460. Portable terminal 401 can easily be held in user's hand.

Screen controller 417 controls display of a display panel 413 (illustrated in FIG. 6) provided in portable terminal 401. For example, screen controller 417 displays various guide images and a menu screen of portable terminal 401 on display panel 413.

CPU 420 controls operation of portable terminal 401 using storage 427 and each unit of portable terminal 401. Storage 427 is a memory, such as a ROM and a RAM. A control program 427a executed by portable terminal 401 is stored in storage 427. By executing control program 427a, CPU 420 performs the control of the operation of portable terminal 401 and conducts wireless communication with image forming device 1 using communication unit 450.

Travel information detector 440 includes a motion sensor 441 and a sensor driver 442. Travel information detector 440 continuously senses information on a travel distance of portable terminal 401 by sensing an acceleration applied to portable terminal 401. For example, motion sensor 441 is an acceleration sensor. For example, a MEMS (Micro-Electro Mechanical System) sensor is used as the acceleration sensor. However, the acceleration sensor is not limited to the MEMS sensor. Sensor driver 442 drives motion sensor 441 by supplying an electric power to motion sensor 441. Sensor driver 442 can acquire information on the acceleration sensed by motion sensor 441.

Communication unit 450 is configured to be able to conduct wireless communication with image forming device 1 by a predetermined method. As described later, communication unit 450 can conduct wireless communication while the connection is established between image forming device 1 and portable terminal 401. While the connection is not established between image forming device 1 and portable terminal 401, the data communication cannot be conducted between the two.

For example, positional information detector 460 includes a GPS (Global Positioning System) receiving chip set in which the GPS is used. Using positional information detector 460, portable terminal 401 can measure a position of portable terminal 401 to obtain positional data (an example of the information on the position).

[Configuration of Image Forming Device 1]

Figure 2:
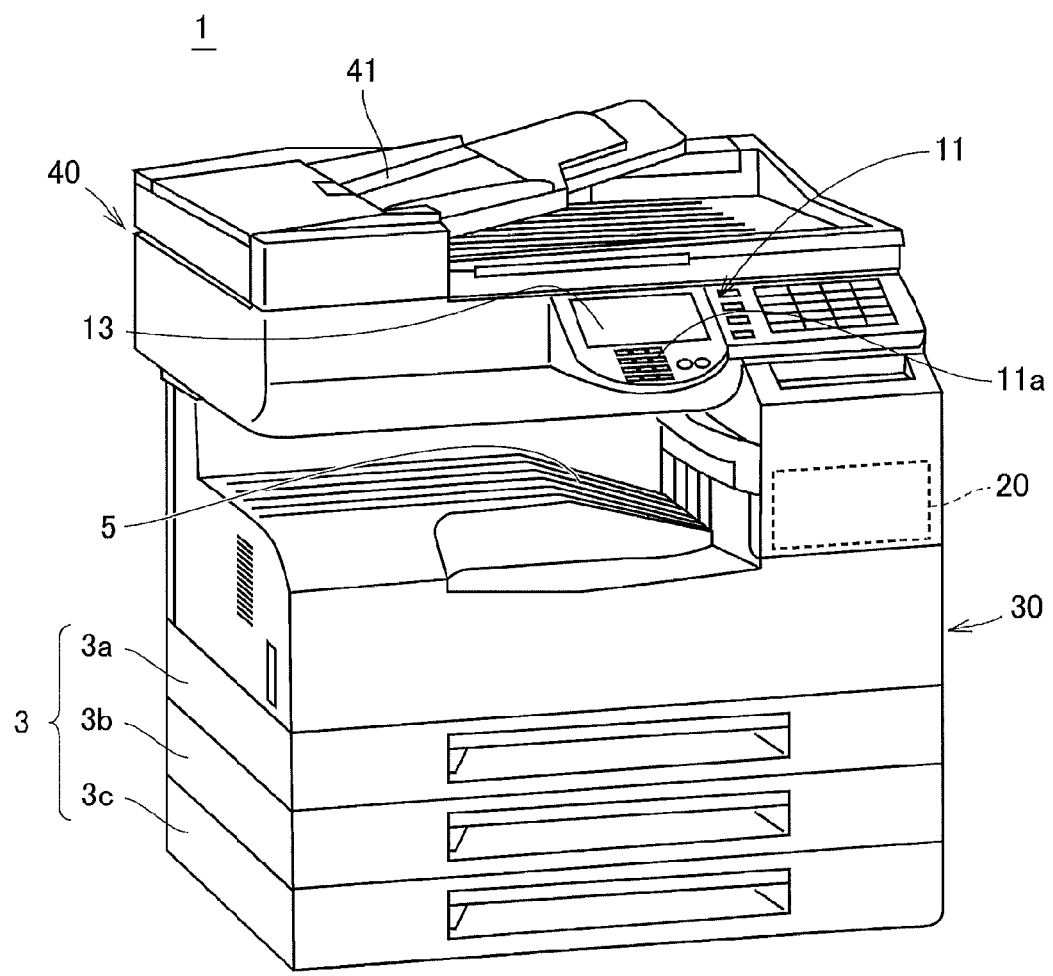
FIG. 2 is a perspective view illustrating the image forming device.

FIG. 2 is a perspective view illustrating image forming device 1.

Referring to FIG. 2, image forming device 1 includes a sheet feed cassette 3, a sheet discharge tray 5, a manipulation unit 11, a CPU 20, an image forming unit 30, and an image reader 40. CPU20 controls operations of image forming device 1. Such as CPU 20, image forming unit 30, and image reader 40 are disposed in a chassis of image forming device 1.

Image forming device 1 includes three sheet-feed cassettes 3 (sheet-feed cassettes 3a, 3b, 3c). For example, sheets having different sizes (such as a B5 size, an A4 size and an A3 size) are loaded on sheet-feed cassettes 3. Sheet-feed cassettes 3 are disposed in a lower portion of image forming device 1 while being able to be inserted in and taken out from the chassis of image forming device 1. During the print, the sheets loaded in each sheet-feed cassette 3 are fed one by one and delivered to image forming unit 30. The number of sheet-feed cassettes 3 is not limited to three, but the number of sheet-feed cassettes 3 may be larger or smaller than three.

In the chassis of image forming device 1, sheet discharge tray 5 is disposed above a region in which image forming unit 30 is accommodated and below a region in which image reader 40 is disposed. The sheet in which the image is formed by image forming unit 30 is discharged to sheet discharge tray 5 from an inside of the chassis.

Manipulation unit 11 is disposed on a front (front surface in FIG. 2) side in an upper portion of image forming device 1. A plurality of manipulation buttons 11a that can be pressed by a user are disposed in manipulation unit 11. A display panel 13 that displays information to the user is disposed in manipulation unit 11.

Display panel 13 is touch panel. For example, display panel 13 is LCD (Liquid Crystal Display). Display panel 13 displays a guide screen to the user and a manipulation button, and receives a touch manipulation from the user. Display panel 13 performs the display controlled by screen controller 17 under the control of CPU20. Manipulation unit 11 accepts manipulation by the user to manipulation button 11a or display panel 13. When the user manipulates manipulation button 11a or display panel 13, manipulation unit 11 transmits a manipulation signal or a predetermined command corresponding to the manipulation to CPU 20. That is, the user can cause image forming device 1 to perform various operations by manipulating manipulation button 11a or display panel 13.

Image forming unit 30 generally includes a toner image forming unit (not illustrated), a sheet conveying unit (not illustrated), and a fixing device (fixing device). Image forming unit 30 forms an image on paper by electrophotography.

The sheet conveying unit is constructed by a sheet feed roller, a conveying roller, and a motor that drives the sheet feed roller and the conveying roller. In the sheet conveying unit, the sheet is fed from sheet-feed cassette 3 and conveyed in the chassis of image forming device 1. The sheet conveying unit discharges the sheet in which the image is formed to sheet discharge tray 5 from the chassis of image forming device 1.

The fixing device includes a heating roller and a pressurizing roller. The fixing device conveys the sheet in which the image is formed while the sheet is nipped between the heating roller and the pressurizing roller, and heats and pressurizes the sheet. Therefore, the fixing device melts toner adhering to the sheet, and fixes the toner to the sheet to form the image in the sheet.

Image reader 40 is disposed in the upper portion of the chassis of image forming device 1. Image reader 40 includes an ADF (Auto Document Feeder) 41. Image reader 40 performs the scanner function. In image reader 40, a manuscript disposed on a transparent manuscript stage is scanned with a contact image sensor and read as image data. In image reader 40, the pieces of image data of the plurality of manuscripts are read by contact image sensor while the manuscripts set in a manuscript tray are sequentially taken in by the ADF 41.

The image read by image reader 40 is converted into a finish image by CPU 20. CPU 20 can transmit the generated finish image to an external device, or cause image forming unit 30 to form an image on a sheet based on the finish image.

Figure 3:
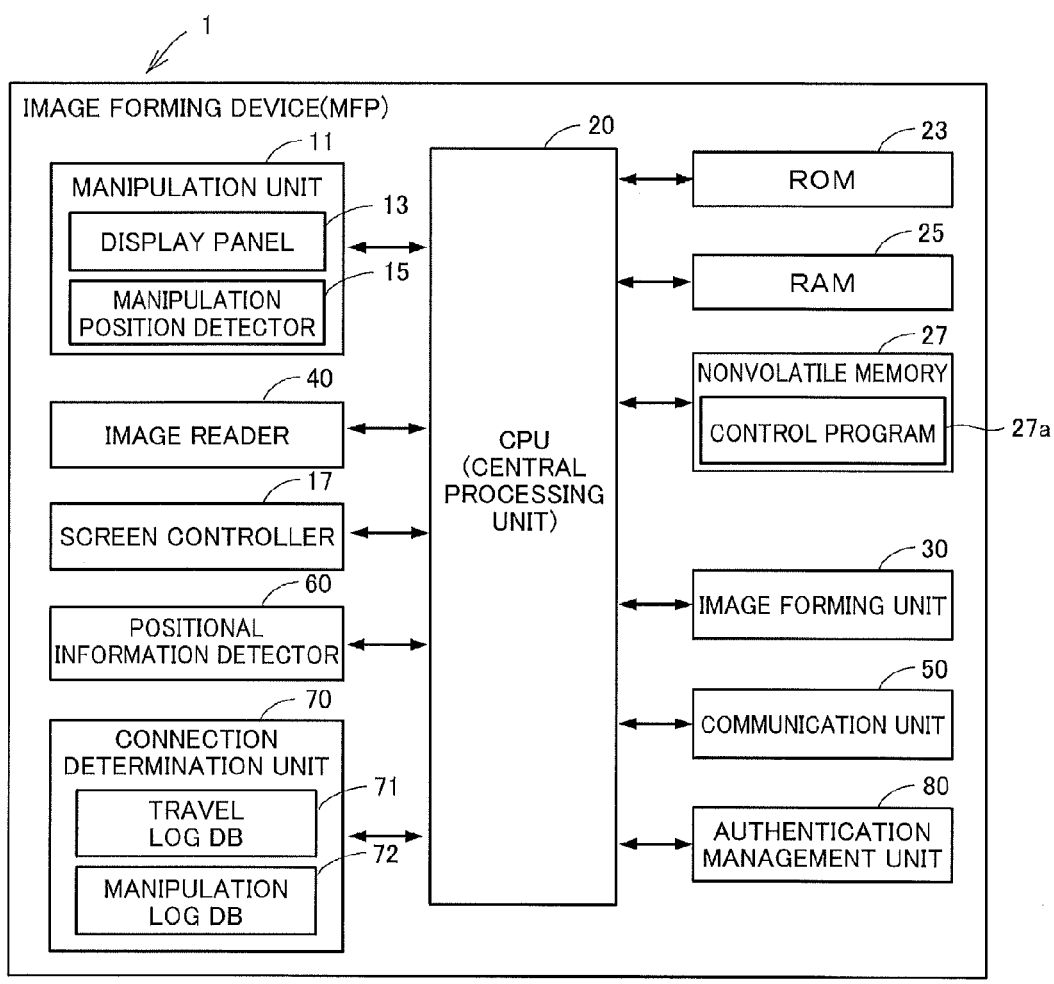
FIG. 3 is a block diagram illustrating a hardware configuration of the image forming device.

FIG. 3 is a block diagram illustrating a hardware configuration of image forming device 1.

As illustrated in FIG. 3, image forming device 1 includes a ROM 23, a RAM 25, and a nonvolatile memory 27 in addition to each of the above units.

For example, nonvolatile memory 27 is a flash memory or an HDD (Hard Disk Drive). For example, the print job data that is transmitted from the external device connected to image forming device 1 and the image data read by image reader 40 are stored in nonvolatile memory 27. Setting information on image forming device 1 and a control program 27a performing various operations of image forming device 1 are also stored in nonvolatile memory 27. CPU 20 reads control program 27a from nonvolatile memory 27 to execute control program 27a, which allows the control of the operation of image forming device 1.

For example, ROM 23 is a flash ROM (flash memory). Data used in operating image forming device 1 is stored in ROM 23. Like nonvolatile memory 27, various control programs and function setting data of image forming device 1 may be stored in ROM 23. CPU 20 reads and writes the data from and in ROM 23. ROM 23 may not be rewritable.

RAM 25 is a main memory of CPU 20. RAM 25 is used to store the data that is necessary for CPU 20 to execute control program 27a.

CPU 20 is connected to each unit of image forming device 1 so as to be able to transmit and receive a signal. CPU 20 controls various operations of image forming device 1 by executing control program 27a stored in ROM 23, RAM 25, or nonvolatile memory 27. When a manipulation signal is transmitted from manipulation unit 11, or when a manipulation command is transmitted from an external device connected to image forming device 1, CPU 20 executes control program 27a in response to the manipulation signal or the manipulation command. Therefore, the predetermined function of image forming device 1 is performed according to the user manipulation of manipulation unit 11.

As illustrated in FIG. 3, image forming device 1 also includes a screen controller (an example of the manipulation image acquisition unit) 17, a communication unit 50, a positional information detector 60, a connection determination unit 70, and an authentication management unit 80.

Screen controller 17 controls the display of display panel 13. Screen controller 17 performs processing of acquiring an image displayed on display panel 13. That is, screen controller 17 reads a display image previously stored in nonvolatile memory 27 or ROM 23 and displays the display image on display panel 13, or generates the display image to display the display image on display panel 13.

Communication unit 50 is configured to be able to conduct wireless communication with portable terminal 401 by a predetermined method. For example, communication unit 50 can conduct wireless communication with communication unit 450 of portable terminal 401 based on a near field communication standard, such as Bluetooth (registered trademark). At this point, communication unit 50 can conduct data (such as document data and image data) communication while the connection is established between portable terminal 401 and image forming device 1. Communication unit 50 cannot conduct data communication with communication unit 450 while the connection is not established between portable terminal 401 and image forming device 1.

Positional information detector 60 retains positional data (an example of the information on the position) that can specify the site where image forming device 1 is installed. For example, positional information detector 60 is a nonvolatile memory in which the positional data is stored. CPU 20 can obtain the information on the position, in which image forming device 1 is installed, by reading the positional data from positional information detector 60. The positional data is properly written by the user during the installation of image forming device 1. In the positional data, values indicating a longitude and a latitude are expressed by the same geodetic system as the positional data obtained by positional information detector 460.

Like positional information detector 460, positional information detector 60 may be configured to retain the positional data of image forming device 1 by performing the positioning using a GPS.

Connection determination unit 70 determines whether the connection between image forming device 1 and portable terminal 401 is established. In response to the determination made by connection determination unit 70, CPU 20 and communication unit 50 establish the connection between image forming device 1 and portable terminal 401. That is, according to the determination result, connection determination unit 70 establishes the wireless connection between image forming device 1 and portable terminal 401.

Connection determination unit 70 manages a travel log database (DB) 71 and a manipulation log database (DB) 72. Travel information on a travel distance of portable terminal 401 and manipulation information on a position (manipulation position) in which a manipulation input is performed by the user on display panel 13 of image forming device 1 are stored in databases 71 and 72, respectively. These pieces of information are stored when image forming device 1 and portable terminal 401 perform a connection establishing operation.

Authentication management unit 80 performs a user authentication with respect to image forming device 1. The user authentication is a job that identifies and authenticates the user who uses image forming device 1. After the user authentication, the user can log in and use image forming device 1.

For example, an authentication database (not illustrated) stored in nonvolatile memory 27 is used in the user authentication. In the authentication database, information on the user who can be authenticated and authentication information necessary for the user authentication are recorded while correlated with each other. For example, the authentication information is a password that is set in each user. Information on the function that each user is permitted to perform is stored in the authentication database while correlated with the user.

For example, the user authentication is performed as follows. That is, a user authentication screen is presented to the user. User authentication screen is displayed on display panel 13. The user manipulates manipulation unit 11 to input user information (such as an account name) and the password to image forming device 1. When these pieces of information are input to manipulation unit 11, CPU20 refers to authentication database to determine whether the user is authenticated based on the input pieces of data. When the user is authenticated, CPU20 determines that the user is authenticated, and enables the function, which can be performed with respect to the authenticated user, to be performed. At this point, the authenticated user logs in to image forming device 1. Therefore, image forming device 1 can identify the user who uses image forming device 1.

Performing the user authentication and identifying the user, the display of display panel 13 and the utilizable function are adapted to the authenticated user to enhance the convenience of image forming device 1. A high security effect is obtained such that, when the authenticated user exists near image forming device 1, a printed matter is output while being kept away from other users.

In image forming device 1, CPU 20 performs management relating to use authority of the user with respect to the function of image forming device 1 according to the user identified through the user authentication. The use of a predetermined function can be restricted in each user by performing the use authority management, and the high security effect is obtained.

The user authentication method is not limited to the above method, but a well-known method can properly be adopted. The reference database of the authentication information or the subject that performs the authentication may be different from those of the first embodiment. For example, image forming device 1 may possess the authentication information for performing the user authentication, so that image forming device 1 may receive an authentication request from the user, and authenticate the user based on the authentication information. The user may not need to input the information on the account name or the password. In other words, for example, card authentication method in which a contact or non-contact ID card is used or a biometric authentication method in which fingerprint information or venous information on the user is utilized can be adopted. The authentication database may be managed by a server (not illustrated) constituting image forming system 500.

At this point, manipulation position detector 15 is provided in manipulation unit 11. Manipulation position detector 15 detects the position in which the manipulation input is performed on display panel 13 when the user manipulates display panel 13. For example, manipulation position detector 15 detects the position, which is touched by a user's fingertip on display panel 13, as the manipulation position of the user.

[Connection Establishing Operation]

In image forming system 500, the user who holds portable terminal 401 performs a finger sliding manipulation on display panel 13 of image forming device 1, which allows the establishment of the connection between image forming device 1 and portable terminal 401. In the first embodiment, upon establishing the connection, the user authentication is performed to the user who performs the manipulation input of image forming device 1. The connection establishing operation will be described below.

Figure 4:
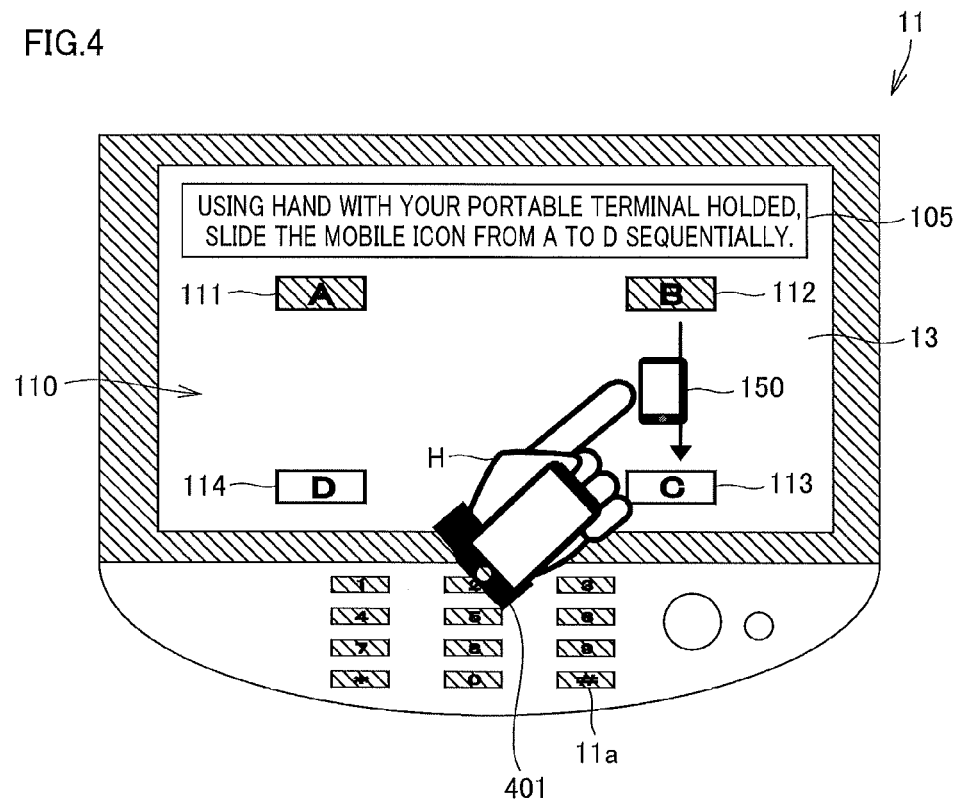
FIG. 4 is a view illustrating a manipulation when a connection establishing operation is performed.

FIG. 4 is a view illustrating a manipulation when the connection establishing operation is performed.

As illustrated in FIG. 4, when the connection establishing operation is performed, a predetermined portable terminal connecting manipulation screen (hereinafter sometimes referred to as a connection screen) is displayed on display panel 13 of manipulation unit 11. The display of the connection screen is performed by screen controller 17. The connection screen includes a message 105 that instructs the user to perform the manipulation, a slide pattern 110 (an example of the manipulation instruction image) and an icon (hereinafter sometimes referred to as a portable terminal icon button) 150. A user's hand H and portable terminal 401 are also illustrated in FIG. 4. However, user's hand H and portable terminal 401 are not illustrated on display panel 13.

Message 105 guides the operation that should be performed by the user. Message 105, which guides the user to slide icon 150 according to slide pattern 110 using hand H that holds portable terminal 401, is displayed in the example in FIG. 4.

Slide pattern 110 is an image that guides the user to perform a predetermined manipulation input. In slide pattern 110, for example, four identification buttons of a first button 111, a second button 112, a third button 113, and a fourth button 114 are disposed in predetermined positions. In FIG. 4, first button 111 is designated by the numeral "A". In FIG. 4, second button 112 is designated by the numeral "B". In FIG. 4, third button 113 is designated by the numeral "C". In FIG. 4, fourth button 114 is designated by the numeral "D". In the example in FIG. 4, first button 111 is disposed on the upper left of display panel 13, second button 112 is disposed on the upper right of display panel 13, third button 113 is disposed on the lower right of display panel 13, and fourth button 114 is disposed on the lower left of display panel 13.

The user performs the following manipulation with slide pattern 110 displayed. That is, the user holds portable terminal 401 in a palm. While holding portable terminal 401, the user touches display panel 13 by a user's fingertip and slides the fingertip on display panel 13 according to slide pattern 110. It is necessary to slide the fingertip as the specified instruction. In the example in FIG. 4, after touching first button 111 with user's fingertip, the user slides the fingertip so as to touch second button 112 with the fingertip (first manipulation). After touching second button 112, the user slides the fingertip to touch third button 113 (second manipulation). After touching third button 113, the user slides the fingertip to touch fourth button 114 (third manipulation). When the fingertip is slid from the button to the button, the user performs the slide manipulation while touching icon 150 with user's fingertip. The position of icon 150 varies according to the slide. The user may release user's finger from display panel 13 in the middle of each manipulation. At this point, the manipulation may be resumed from the point at which the finger is released. A sequence of manipulations may be performed without releasing the finger in midstream.

Slide pattern 110 is not limited to the display in which identification buttons 111 to 114 are displayed. The number of buttons may be two, three or at least five. The position and array of each button may properly be changed by the control of screen controller 17.

Slide pattern 110 may previously be set and stored in image forming device 1. At this point, slide pattern 110 that is properly selected by screen controller 17 (an example of the acquisition) may be displayed in plural kinds of slide patterns 110. Screen controller 17 may generate an image immediately before slide pattern 110 is displayed (an example of the acquisition), and display the generated image as slide pattern 110.

For example, the connection establishing operation is performed when the user performs the touch and print function using portable terminal 401. As used herein, the touch and print function means that, for example, document data stored in portable terminal 401 is output from image forming device 1 such that the user performs a simple manipulation to touch image forming device 1. In the touch and print function of the first embodiment, the document data (an example of the print information) of the user is transferred from portable terminal 401 to image forming device 1 by wireless communication, and image forming device 1 prints the document data. In advance of the wireless communication, the connection between portable terminal 401 and image forming device 1 is established by performing the connection establishing operation.

Figure 5:
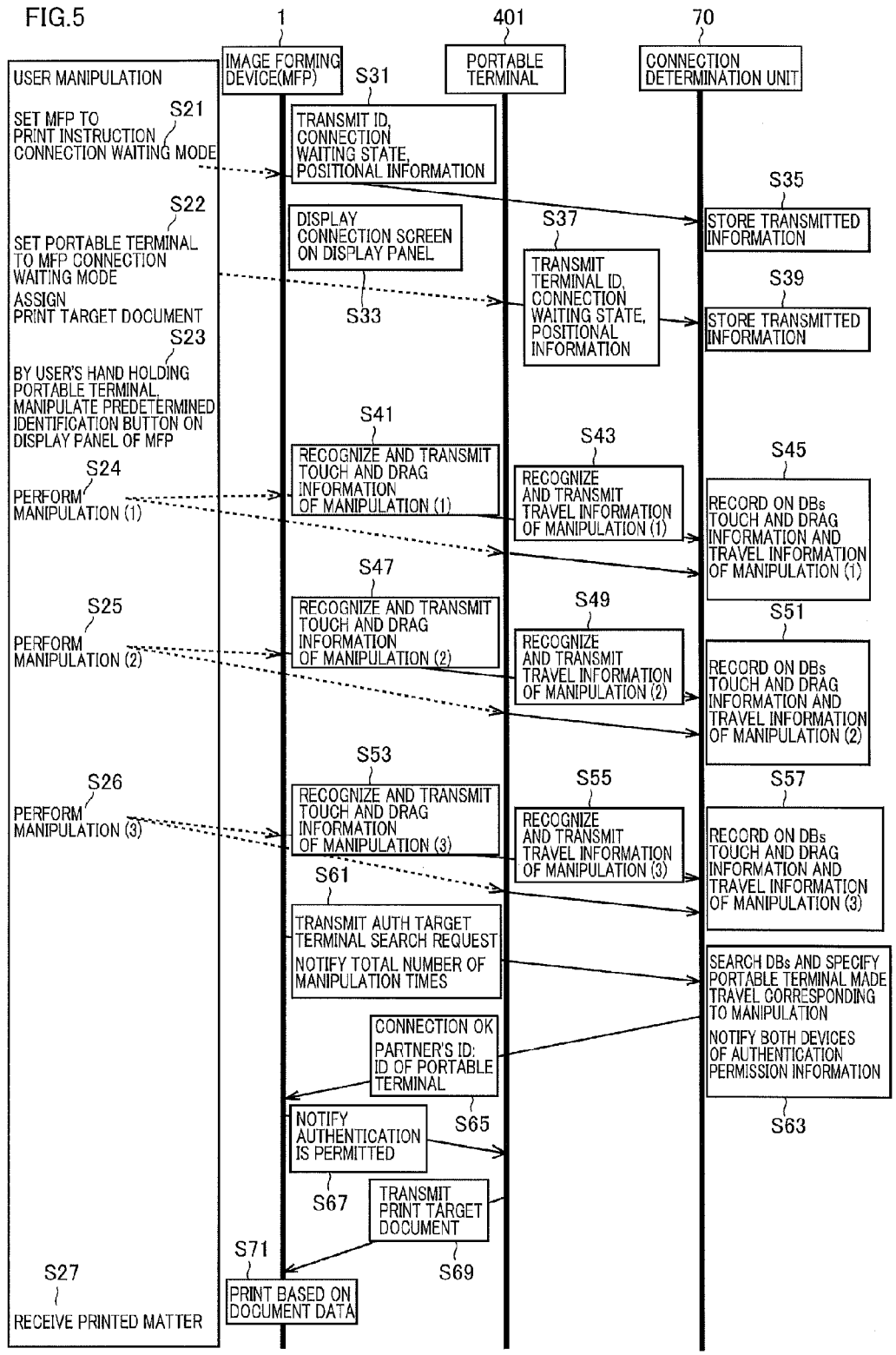
FIG. 5 is a sequence diagram illustrating a touch and print function and the connection establishing operation at that time.

FIG. 5 is a sequence diagram illustrating the touch and print function and the connection establishing operation at that time.

The touch and print function is performed between image forming device 1 and portable terminal 401 in response to the user manipulation. In the connection establishing operation, the information obtained on the side of image forming device 1 and the information obtained on the side of portable terminal 401 are transmitted to connection determination unit 70 of image forming device 1. Connection determination unit 70 determines whether image forming device 1 and portable terminal 401 correspond to each other. Image forming device 1 and connection determination unit 70 are separately illustrated in FIG. 5. This is because the information obtained on the side of image forming device 1 is processed by connection determination unit 70.

As illustrated in FIG. 5, in the touch and print function, the user manipulation is performed in the following order. In Step S21, the user sets an operating mode of image forming device 1 to print instruction connection waiting mode (hereinafter sometimes referred to as a connection waiting mode). The user can change the operating mode by performing a predetermined manipulation.

In Step S22, the user manipulates portable terminal 401 to set the operating mode of portable terminal 401 to an image forming device connection waiting mode (hereinafter sometimes referred to as a connection waiting mode). At this point, the user manipulates portable terminal 401 to assign a print target document. A document that the user wants to output from image forming device 1 is assigned as the print target document.

When the touch and print function is prepared in Steps S21 and S22, the connection establishing operation is started.

In Step S23, the user manipulates the predetermined identification button (key) on display panel 13 of image forming device 1 by user's hand holding portable terminal 401.

In Steps S24 to S26, the user performs an operation (touch and drag operation) to slide the fingertip on display panel 13 according to the display of display panel 13.

For example, the manipulations (1) to (3) are performed according to slide pattern 110 in FIG. 4. The first manipulation is the touch and drag operation to slide icon 150 from first button 111 to second button 112 (S24). The second manipulation is the touch and drag operation to slide icon 150 from second button 112 to third button 113 (S25). The third manipulation is the touch and drag operation to slide icon 150 from third button 113 to fourth button 114 (S26).

For example, CPU 20 may determine that each manipulation is started when the user touches display panel 13. For example, CPU 20 may determine that each manipulation is ended when the user releases the fingertip from display panel 13. The determination that each manipulation is started may be made when manipulation position detector 15 detects that the manipulation position of the user is located at a predetermined position of display panel 13. The determination that each manipulation is ended may be made when manipulation position detector 15 detects that the manipulation position of the user is located at a predetermined position of display panel 13 after the user changes the manipulation position (after the fingertip is slid on display panel 13).

As a result of the manipulations, the connection establishing operation is completed to establish the connection between image forming device 1 and portable terminal 401, and the user authentication is performed. Therefore, the print target document assigned in preparing the touch and print operation is transmitted from portable terminal 401 to image forming device 1. Image forming device 1 prints the received print target document and outputs the printed document.

Therefore, in Step S27, the user can receive a printed matter of the print target document.

In response to the user manipulation, image forming device 1, portable terminal 401, and connection determination unit 70 included in image forming device 1 perform the following pieces of processing to implement the touch and print function. Under the control of CPU 20 of image forming device 1 and CPU 420 of portable terminal 401, the pieces of processing are performed by operating each unit of image forming device 1 and each unit of portable terminal 401.

As illustrated in FIG. 5, in Step S31, CPU 20 of image forming device 1 sets the operating mode of image forming device 1 to the connection waiting mode in response to the user manipulation in Step S21. At this point, CPU 20 transmits a specific kind of information on image forming device 1 to connection determination unit 70. For example, a terminal ID uniquely provided to image forming device 1, information indicating that image forming device 1 is in the connection waiting state, and the positional information that can specify the position where image forming device 1 is installed are transmitted.

In Step S33, CPU 20 of image forming device 1 displays a connection screen on display panel 13.

In Step S35, under the control of CPU 20, connection determination unit 70 acquires and stores the pieces of information transmitted from the side of image forming device 1. For example, the pieces of information are used in the recording of manipulation log database 72.

On the other hand, in Step S37, CPU 420 of portable terminal 401 sets the operating mode of portable terminal 401 to the connection waiting mode in response to the user manipulation in Step S22. At this point, CPU 420 transmits a specific kind of information on portable terminal 401 to connection determination unit 70 of image forming device 1. For example, a terminal ID uniquely provided to portable terminal 401, information indicating that portable terminal 401 is in the connection waiting state, and the positional information that can specify the position of portable terminal 401 are transmitted. For example, the positional information that is obtained as a result of the positioning performed by positional information detector 460 is transmitted.

In Step S39, under the control of CPU 20, connection determination unit 70 acquires and stores the pieces of information transmitted from the side of portable terminal 401. For example, the pieces of information are used in the recording of travel log database 71.

When the user manipulation is started (Step S23), the data obtained on the side of image forming device 1 and the data obtained on the side of portable terminal 401 are transmitted to connection determination unit 70 in response to the manipulations in Steps S24 to S26. The transmitted pieces of data are recorded while separated in travel log database 71 and manipulation log database 72.

When the first user manipulation in Step S23 is performed, CPU 20 of image forming device 1 performs the following operation in Step S41. That is, when the user performs the touch and drag manipulation, the touch and drag manipulation is sensed by display panel 13. When manipulation position detector 15 recognizes the position of the touch and drag manipulation, CPU 20 transmits information (hereinafter sometimes referred to as manipulation information) on the manipulation position to connection determination unit 70.

In Step S43, CPU 420 of portable terminal 401 performs the following operation. When the user performs the manipulation, travel information detector 440 recognizes information (hereinafter sometimes referred to as travel information) on the travel distance of portable terminal 401. CPU 420 transmits the travel information to connection determination unit 70.

In Step S45, when receiving (acquiring) the manipulation information on the side of image forming device 1 and the travel information on the side of portable terminal 401, connection determination unit 70 records the manipulation information and the travel information in databases 71 and 72 under the control of CPU 20. That is, the manipulation information on the side of image forming device 1 is recorded in manipulation log database 72. The travel information on the side of portable terminal 401 is recorded in travel log database 71. At this point, the recorded data includes the pieces of information stored in Steps S35 and 39, the manipulation information or the travel information, and information on the clock time the manipulation or the travel is performed.

At this point, for example, CPU 20 or manipulation position detector 15 monitors the manipulation position from the beginning to the end of the manipulation. When the manipulation is ended, information of the sequence of manipulations (for example, the manipulations of first button 111 and second button 112 in FIG. 4) is transmitted. CPU 420 or travel information detector 440 monitors the travel distance until the travel is stopped since the travel is started. When the travel is stopped, CPU 420 or travel information detector 440 transmits information on the sequence of travels. The information may sequentially be transmitted from the side of image forming device 1 or the side of portable terminal 401 at predetermined time intervals since the manipulation or the travel is started. In this case, connection determination unit 70 may record information, which is calculated from the received information, in databases 71 and 72.

The same processing is performed when the second manipulation in Step S24 and the third manipulation in Step S25 are performed.

In Steps S47 and S53, as with the processing in Step S41, CPU 20 of image forming device 1 transmits the manipulation information to connection determination unit 70.

In Steps S49 and S55, as with the processing in Step S43, CPU 20 of portable terminal 401 transmits the travel information on portable terminal 401 to connection determination unit 70.

In Steps S51 and 57, under the control of CPU 420, connection determination unit 70 records the travel information in travel log database 71, and records the manipulation information in manipulation log database 72.

In Step S61, when the third manipulation is ended, namely, when the user manipulation is ended, CPU 20 of image forming device 1 senses that the user manipulation is ended. CPU 20 transmits an authentication target terminal search request (hereinafter sometimes referred to as a search request) to connection determination unit 70. The search request is transmitted to determine existence or non-existence of the portable terminal that can be connected to image forming device 1. At this point, CPU 20 notifies connection determination unit 70 of the total number of manipulation times.

CPU 20 or manipulation position detector 15 determines the end of the user manipulation by the following way. For example, the determination that the user manipulation is ended is made when manipulation position detector 15 senses that the manipulation position of the user is located in the position that is previously set as a manipulation end position. For example, the determination that the user manipulation is ended may be made when a predetermined time elapses since the user's fingertip is released from display panel 13.

In Step S63, when the search request is transmitted, connection determination unit 70 searches the terminal. CPU 20 searches databases 71 and 72 to specify portable terminal 401 in which a travel pattern corresponds to the manipulation performed by image forming device 1. In other words, connection determination unit 70 compares the manipulation information and the travel information to determine whether the manipulation input by the user and the travel of portable terminal 401 correspond to each other. The processing is performed as follows.

When portable terminal 401 is specified, connection determination unit 70 notifies image forming device 1 and portable terminal 401 of authentication permission information. Therefore, the connection between image forming device 1 and portable terminal 401 is established. That is, portable terminal 401 is communicably registered in image forming device 1, and image forming device 1 and portable terminal 401 can conduct wireless communication with each other.

In Step S65, connection determination unit 70 transmits the connection permission information and the terminal ID of portable terminal 401, which is the terminal ID of the other side of the connection permission, onto the side of image forming device 1.

In Step S67, CPU 20 of image forming device 1 performs the user authentication based on the information transmitted from connection determination unit 70. That is, the user authentication is performed according to the determination result made by connection determination unit 70. When the user authentication is performed, portable terminal 401 is notified that the authentication is permitted.

In image forming device 1 of the first embodiment, the user authentication can be performed based on the terminal ID of portable terminal 401. For example, the terminal ID of portable terminal 401 that the user uses is previously recorded in the authentication database while correlated with the user who can be authenticated by image forming device 1. The connection establishing operation is performed between image forming device 1 and portable terminal 401 to establish the connection, and the terminal ID of portable terminal 401 in which the connection has been established is transmitted, whereby CPU 20 performs the user authentication to the user corresponding to the terminal ID. Therefore, the user can perform the user authentication such that only the simple manipulation is performed without separately registering the password. When the authentication is established, image forming device 1 may identify the user who performs the user authentication based on the terminal ID of portable terminal 401 to makes a request to the user to input the corresponding password.

In Step S69, CPU 420 of portable terminal 401 transmits the print target document data to image forming device 1. The print target document data can be transmitted by wireless communication when the connection between image forming device 1 and portable terminal 401 is established.

At this point, until the connection between image forming device 1 and portable terminal 401 is established, a user authority is controlled such that the document data cannot be transmitted and received even if the user authenticated. In other words, the operation to transmit and receive the document data is prohibited until the connection is established. When the connection is established, the wireless communication can be conducted, and the authority necessary to transmit and receive the document data is provided to the authenticated user. For example, CPU 20 performs the control. Irrespective of the user authentication, the authority on the transmission and reception of the document data may be controlled based on whether the connection between image forming device 1 and portable terminal 401 is established.

In Step S71, CPU 20 of image forming device 1 performs the print based on the received print target document data. Therefore, the touch and print operation is ended, and the user can receive the printed matter.

The user may perform the print target document assigning manipulation after the connection establishing operation, namely, after the establishment of the connection between image forming device 1 and portable terminal 401.

The print target document may be assigned or printed when the connection establishing operation is performed while the user authentication is not performed.

Figure 6:
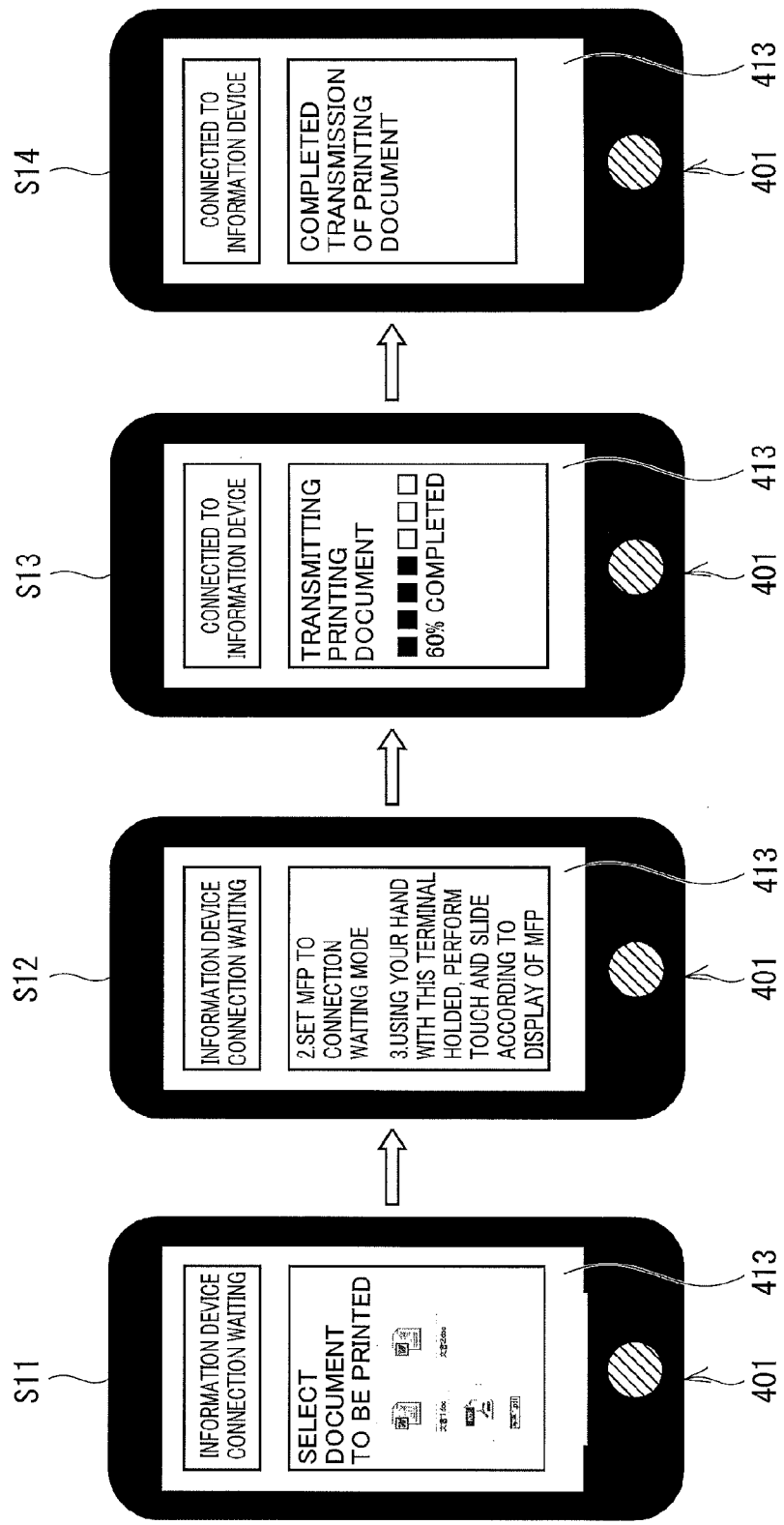
FIG. 6 is a view illustrating a display example of a display panel of a portable terminal when the touch and print function is performed.

FIG. 6 is a view illustrating a display example of display panel 413 of portable terminal 401 when the touch and print function is performed.

As illustrated in FIG. 6, when the touch and print function is performed, the user manipulates portable terminal 401 to set the operating mode of portable terminal 401 to the connection waiting mode in Step S11. At this point, the connection waiting mode and the request to assign the print target document are displayed on display panel 413. The user performs the predetermined manipulation while viewing display panel 413, which allows the user to assign the print target document.

Portable terminal 401 can establish the connection to not only the image forming device but also an information instrument that can conduct communication by a predetermined method. Therefore, in the connection waiting mode, a message that the information instrument waist for the connection is displayed on display panel 413.

When the user assigns the print target document, display panel 413 displays a guide for the user manipulation necessary to perform the connection establishing operation in Step S12.

When the user manipulation is performed to establish the connection between image forming device 1 and portable terminal 401, the print target document data is transferred from portable terminal 401 to image forming device 1 in Step S13. At this point, for example, a message that "an information instrument is currently connected" is displayed on display panel 413, and the state in which the connection to image forming device 1 is established is displayed on display panel 413. A progress situation of the data transfer is also displayed on display panel 413. The user can view the progress situation to roughly recognize a time necessary for the data transfer.

When the data transfer of the print target document is completed, display panel 413 displays a message that the data transfer is completed in Step S14.

[Processing Relating to Travel Information on Portable Terminal 401]

For example, sensor driver 442 of portable terminal 401 acquires the travel information on portable terminal 401, and then connection determination unit 70 of image forming device 1 acquires the travel information on portable terminal 401.

Figure 7:
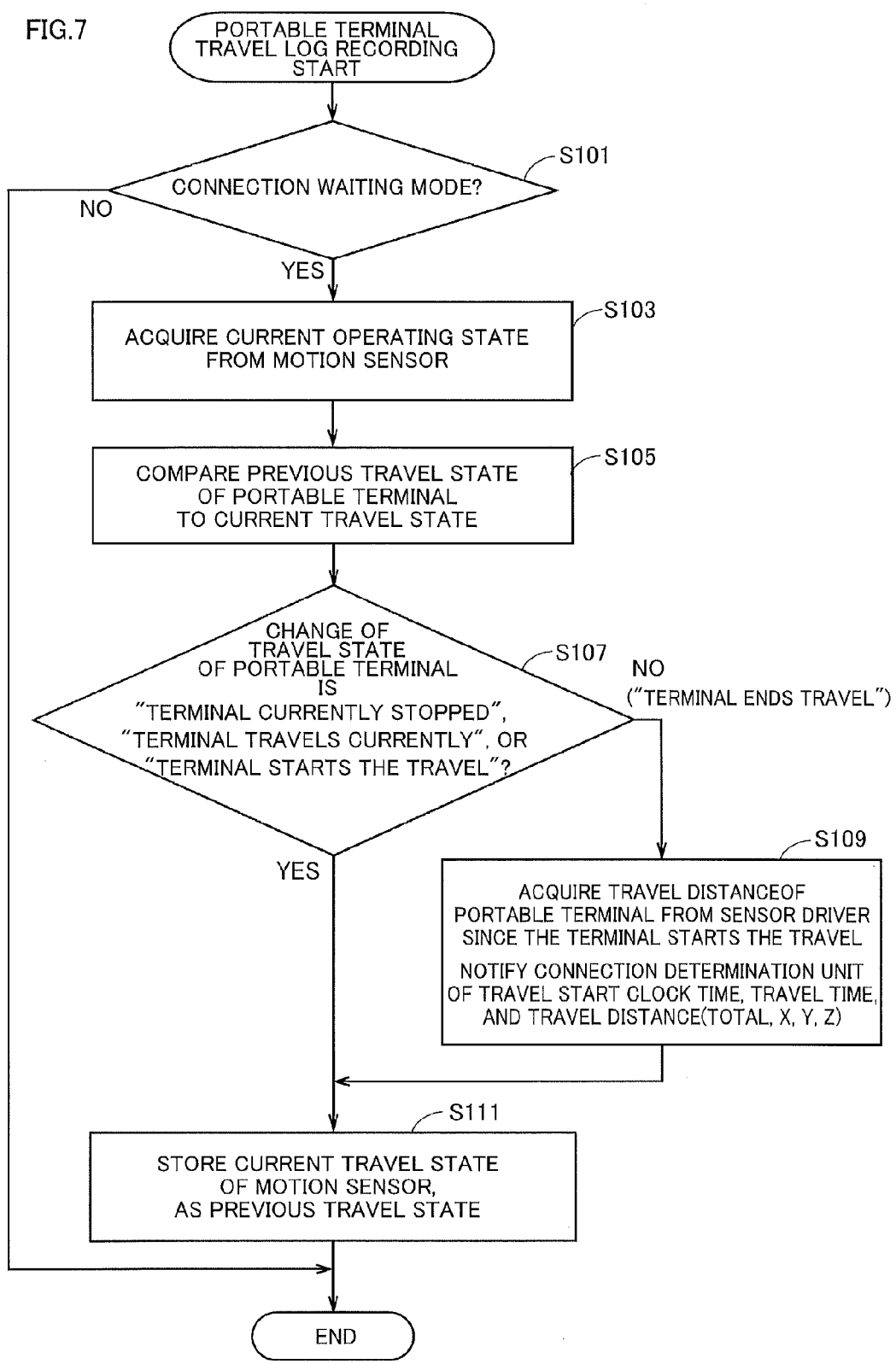
FIG. 7 is a flowchart illustrating an operation to acquire travel information on the portable terminal.

FIG. 7 is a flowchart illustrating an operation to acquire the travel information on portable terminal 401.

In Step S101, CPU 420 of portable terminal 401 determines whether the operating mode of portable terminal 401 is the connection waiting mode. When the operating mode of portable terminal 401 is not the connection waiting mode, the subsequent processing is not performed, but the processing is ended.

When the operating mode of portable terminal 401 is the connection waiting mode in Step S101, CPU 420 acquires the current operating state from motion sensor 441 in Step S103. For example, CPU 420 acquires the current operating state through sensor driver 442.

In Step S105, CPU 420 compares the previous travel state of portable terminal 401 to the current travel state. Therefore, CPU 420 senses a change of the travel state of portable terminal 401.

At this point, "the terminal is currently stopped" and "the terminal travels currently" can be cited as the travel state (operating state) of portable terminal 401, which is sensed by motion sensor 441.

When the previous travel state is "the terminal is currently stopped", and when the current travel state is "the terminal is currently stopped", portable terminal 401 is in the state in which "the terminal is currently stopped".

When the previous travel state is "the terminal is currently stopped", and when the current travel state is "the terminal travels currently", portable terminal 401 is in the state in which "the terminal starts the travel".

When the previous travel state is "the terminal travels currently", and when the current travel state is "the terminal travels currently", portable terminal 401 is in the state in which "the terminal travels currently".

When the previous travel state is "the terminal travels currently", and when the current travel state is "the terminal is currently stopped", portable terminal 401 is in the state in which "the terminal ends the travel".

In Step S107, CPU 420 determines whether the change of the travel state of portable terminal 401 is "the terminal is currently stopped", "the terminal travels currently", or "the terminal starts the travel". In other words, CPU 420 determines whether the change of the travel state of portable terminal 401 is "the terminal ends the travel".

When the change of the travel state of portable terminal 401 is "the terminal ends the travel" in Step S107, CPU 420 acquires the travel distance of portable terminal 401 from sensor driver 442 since the terminal starts the travel in Step S109. CPU 420 notifies connection determination unit 70 of a travel start clock time (an example of the information on a travel clock time) and a travel time (a time between the travel start and the travel end), and the travel distance. As to the travel distance, CPU 420 notifies connection determination unit 70 of a total value (Total) of the travel distances and a component in each of X-, Y-, and Z-axis directions.

When the processing in Step S109 is performed, or when the change of the travel state of portable terminal 401 is not "the terminal ends the travel" in Step S107, processing in Step S111 is performed. In Step S111, CPU 420 stores the current travel state, namely, the travel state acquired in Step S103 as the previous travel state. When the processing in Step S111 is ended, the sequence of pieces of processing is tentatively ended.

The above pieces of processing are repeatedly performed.

Thus, the travel information of which portable terminal 401 notifies connection determination unit 70 is sequentially recorded as the travel log in travel log database 71, and managed. The travel log recorded in travel log database 71 will be described below.

FIG. 8 is a view illustrating a recording example of the travel log in travel log database 71.

As illustrated in FIG. 8, the travel information transmitted from each terminal to image forming device 1 is recorded as the travel log in travel log database 71. Each travel log is recorded according to one-time travel (from the travel start to the travel end, namely, from "the terminal is currently stopped" to "the terminal is currently stopped" via "the terminal travels currently"). Each travel log (record) includes a number specifying the travel log (Travel log number), the travel start clock time, the terminal ID, the travel time, the total travel distance (Total), the X-axis direction component (x) of the travel distance, the Y-axis direction component (y) of the travel distance, the Z-axis direction component (z) of the travel distance, the terminal position (north latitude), and the terminal position (cast longitude).

For example, the number specifying the travel log is provided in the recording order. The terminal ID corresponding to the terminal that transmits the travel information is recorded. The value that is measured by the positional information detector of each terminal is recorded as the terminal position.

In the example in FIG. 8, the travel logs of three terminals having the terminal IDs "ABC0001", "ABC0022", and "ABC0024" are recorded in travel log database 71. The position of each terminal can be specified from the value of the field of the terminal position.

In FIG. 8, in each travel log, the Z-axis direction component of the travel distance is set to 0 mm. This is because the following processing is performed. In the first embodiment, detection values of travel distances x, y, and z in the initial travel of portable terminal 401 are checked against the travel distance values sensed on display panel 13 to calculate an offset value. In other words, the offset value is detected such that the travel direction of portable terminal 401 is assumed to be identical to the user manipulation input direction detected by display panel 13 at the time user starts the manipulation input. The travel distance is converted by reflecting the offset value on the travel distance during the recording in the travel log. Therefore, the travel distance of portable terminal 401 is expressed as information on a biaxial direction (X-axis direction and Y-axis direction) corresponding to two-dimensional positional information on display panel 13. When the travel information and the manipulation information are compared to each other based on the information on the biaxial direction, the comparison is performed according to the offset value. The travel detection detected by portable terminal 401 that travel three-dimensionally is not matched with the two-dimensional direction of display panel 13. The processing is performed in order to solve this problem. Therefore, when the travel distance on the side of portable terminal 401 is compared to the travel distance on the side of image forming device 1, the comparison processing can easily be performed.

[Processing Relating to Manipulation Information on Image Forming Device 1]

Manipulation position detector 15 of image forming device 1 acquires the information on the manipulation position of image forming device 1, and then connection determination unit 70 acquires the information on the manipulation position of image forming device 1.

Figure 9:
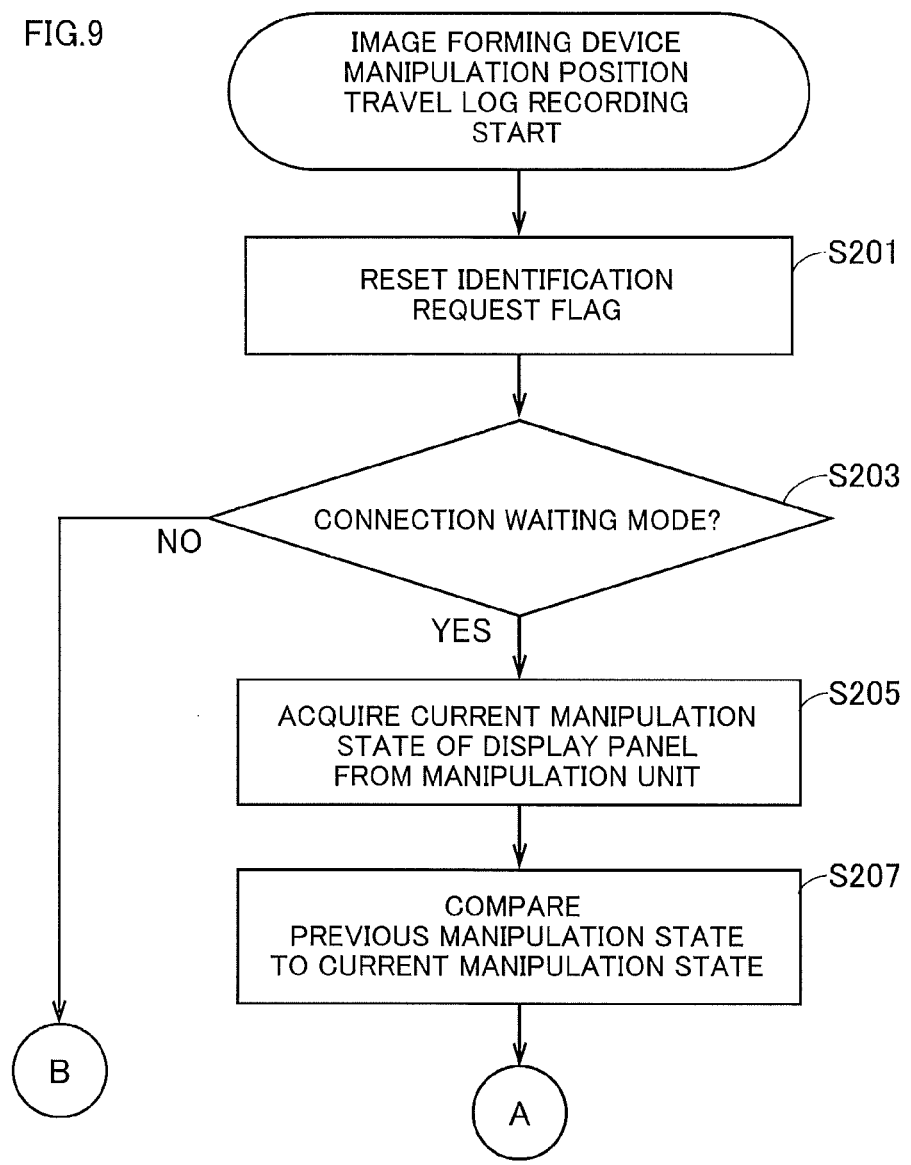
FIGS. 9 and 10 are flowcharts illustrating an operation to acquire manipulation information on the image forming device.
Figure 10:
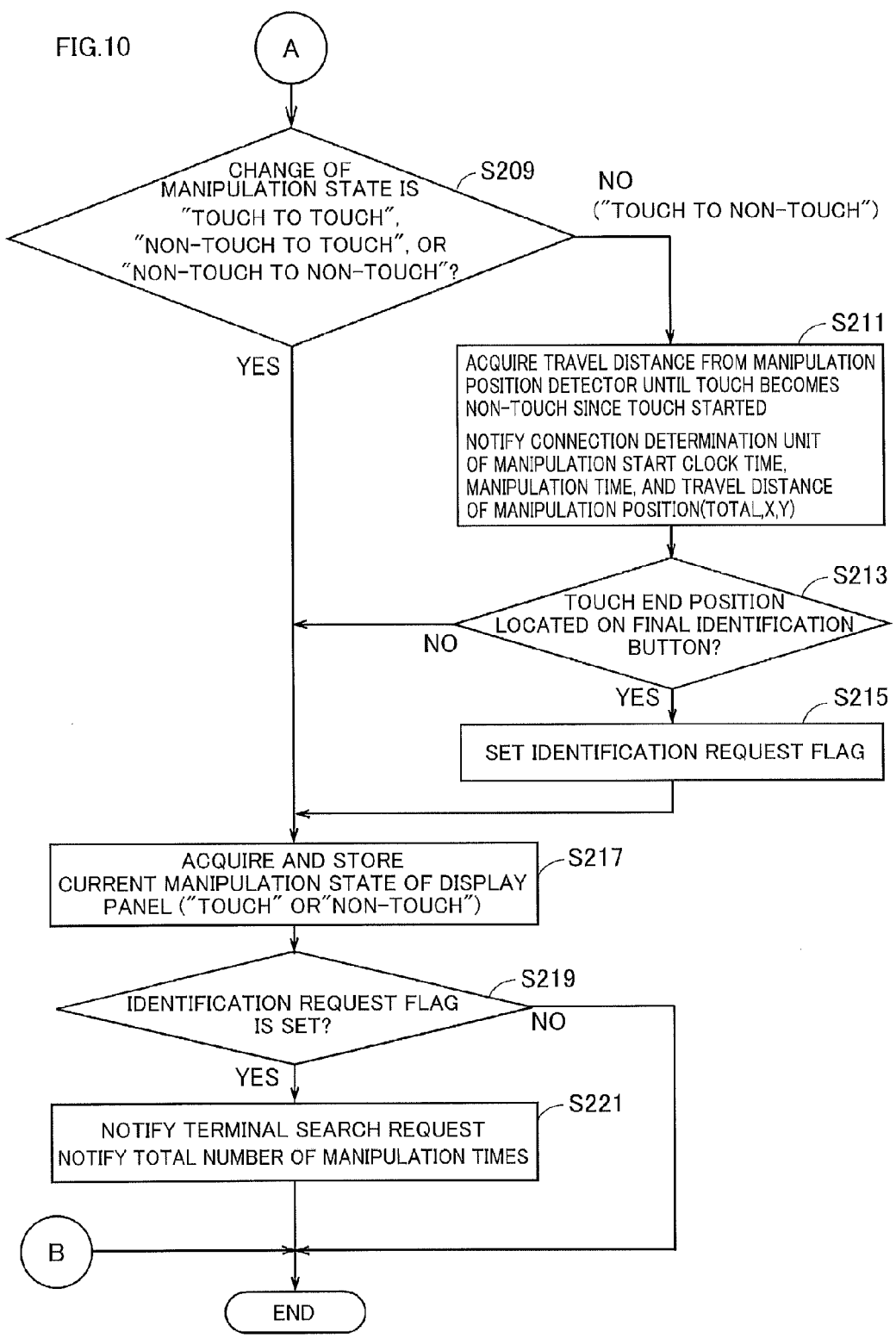

FIGS. 9 and 10 are flowcharts illustrating an operation to acquire the manipulation information on image forming device 1.

In Step S201, CPU 20 of image forming device 1 resets an identification request flag. The identification request flag is provided in order to transmit a search request in the predetermined case.

In Step S203, CPU 20 determines whether the operating mode of image forming device 1 is the connection waiting mode. When the operating mode of portable terminal 401 is not the connection waiting mode, the subsequent processing is not performed, but the processing is ended.

In Step S205, CPU 20 acquires the current manipulation state of display panel 13 from manipulation unit 11.

In Step S207, CPU 20 compares the previous manipulation state of display panel 13 to the current manipulation state. Therefore, CPU 20 senses the change of the manipulation state of display panel 13.

At this point, a "touch" state in which the user touches display panel 13 with user's fingertip and a "non-touch" state in which the user does not touch display panel 13 can be cited as the manipulation state of display panel 13.

When the previous manipulation state is "touch", and when the current manipulation state is "touch", the change of the manipulation state of display panel 13 is "touch to touch".

When the previous manipulation state is "non-touch", and when the current manipulation state is "touch", the change of the manipulation state of display panel 13 is "non-touch to touch".

When the previous manipulation state is "non-touch", and when the current manipulation state is "non-touch", the change of the manipulation state of display panel 13 is "non-touch to non-touch".

When the previous manipulation state is "touch", and when the current manipulation state is "non-touch", the change of the manipulation state of display panel 13 is "touch to non-touch".

In Step S209, CPU 20 determines whether the change of the manipulation state of display panel 13 is "touch to touch", "non-touch to touch", or "non-touch to non-touch". In other words, CPU 20 determines whether the change of the manipulation state of display panel 13 is "touch to non-touch".

When the change of the manipulation state of display panel 13 is "touch to non-touch" in Step S211, CPU 20 acquires the travel distance of the manipulation position from manipulation position detector 15 until the touch becomes the non-touch since the touch is started in Step S211. CPU 20 notifies connection determination unit 70 of a manipulation start clock time (an example of the information on a clock time the user performs the manipulation input), a manipulation time (a time since the start of the manipulation), and the travel distance of the manipulation position. As to the travel distance, CPU 420 notifies connection determination unit 70 of a total value (Total) of the travel distances and the travel distances as a component in each of X- and Y-axis directions.

In Step S213, CPU 20 determines whether a touch end position (manipulation position at the time the touch becomes the non-touch) is located on the final identification button. As used herein, the final identification button means the button indicating the position of the ending point in the manipulations that are assigned and performed by the user. For example, in slide pattern 110 in FIG. 4, the final identification button is fourth button 114.

When the touch end position is located on the final identification button in Step S213, CPU 20 sets an identification request flag in Step S215.

While the processing in Step S215 is performed, when the change of the manipulation state of display panel 13 is not "touch to non-touch" in Step S209, and when the touch final position is not located on the final identification button in Step S213, the processing in Step S217 is performed. That is, in Step S217, CPU 20 stores the current manipulation state of display panel 13, namely, the manipulation state acquired in Step S205. The manipulation state is stored as the previous manipulation state.

In Step S219, CPU 20 determines whether the identification request flag is set.

When the identification request flag is set in Step S219, CPU 20 notifies connection determination unit 70 of the search request in Step S221. At this point, CPU 20 notifies connection determination unit 70 of the total number of manipulation times.

When the processing in Step S219 is ended, or when the identification request flag is not set in Step S219, the sequence of pieces of processing is tentatively ended.

The above pieces of processing are repeatedly performed.

Thus, the manipulation information on display panel 13 of which portable terminal 401 notifies connection determination unit 70 is sequentially recorded as the manipulation log in manipulation log database 72, and managed. The manipulation log recorded in manipulation log database 72 will be described below.

FIG. 11 is a view illustrating a recording example of the manipulation log in manipulation log database 72.

As illustrated in FIG. 11, the manipulation information on display panel 13 of image forming device 1 is recorded as the manipulation log in manipulation log database 72. Each manipulation log is recorded according to the one-time manipulation (from the beginning to the end of the touch, namely, from "non-touch" to "non-touch" via "touch"). Each manipulation log (record) includes a number specifying the manipulation log (Manipulation log number), the manipulation start clock time, the terminal ID, the travel time (manipulation time), the total travel distance (Total), the X-axis direction component (x) of the travel distance, the Y-axis direction component (y) of the travel distance, the terminal position (north latitude), and the terminal position (east longitude).

For example, the number specifying the manipulation log is provided in the recording order. The terminal ID of image forming device 1 is recorded. In the first embodiment, the positional data that is previously registered as the installation position of image forming device 1 in positional information detector 60 is recorded as the terminal position.

In the example in FIG. 11, three manipulation logs are recorded in manipulation log database 72. The manipulation logs are recorded when display panel 13 of image forming device 1 having the terminal ID "MFP001" is performed.

The records of databases 71 and 72 may be deleted every time the connection establishing operation is ended.

[Relationship Between Touch and Drag Operation and Manipulation State or Travel State]

Figure 12:
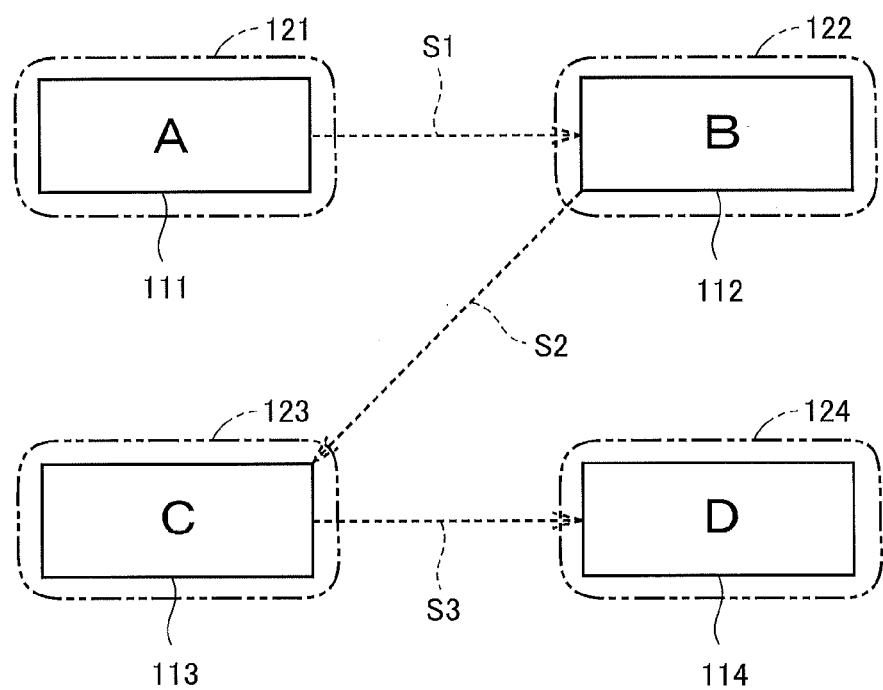
FIG. 12 is a view illustrating an example of a slide pattern.

FIG. 12 is a view illustrating an example of the slide pattern.

A slide pattern 110a in FIG. 12 differs from slide pattern 110 in FIG. 4 in the order of identification buttons 111 to 114. In slide pattern 110a, first button 111 is disposed on the upper left of slide pattern 110a, second button 112 is disposed on the upper right of slide pattern 110a, third button 113 is disposed on the lower left of slide pattern 110a, and fourth button 114 is disposed on the lower right of slide pattern 110a.

The user manipulation performed to slide pattern 110a is finely divided into three manipulations. In a first manipulation S1, the manipulation position is changed from first button 111 to second button 112, and portable terminal 401 travels. In a second manipulation S2, the manipulation position is changed from second button 112 to third button 113, and portable terminal 401 travels. In a third manipulation S3, the manipulation position is changed from third button 113 to fourth button 114, and portable terminal 401 travels.

When first manipulation S1 is performed, the manipulation state of display panel 13 and the travel state of portable terminal 401 change as follows.

The user touches first button 111 with the user's finger. At this point, the manipulation state changes from "non-touch" to "touch". The travel state changes from "the terminal is currently stopped" to "the terminal travels currently".

The user moves user's finger toward second button 112 while touching display panel 13. At this point, the manipulation state remains in "touch". The travel state remains in "the terminal travels currently".

When user's finger reaches second button 112, the user releases the finger from display panel 13. At this point, the manipulation state changes from "touch" to "non-touch". The travel state changes from "the terminal travels currently" to "the terminal is currently stopped".

The manipulation state remains in "non-touch" until the user touches second button 112. The travel state remains in "the terminal is currently stopped".

As with first manipulation S1, the manipulation state and the travel state change in second manipulation S2 and third manipulation S3.

In the first embodiment, even if the user manipulation position is not always located on identification buttons 111 to 114, manipulation position detector 15 may detect the manipulation position as being located on identification buttons 111 to 114. For example, as illustrated in FIG. 12, when the manipulation position is located within each of predetermined areas 121 to 124 around identification buttons 111 to 114, the manipulation position may be detected as being located on identification buttons 111 to 114. For example, each of areas 121 to 124 is provided such that a position located a predetermined distance away from an outer edge of each of identification buttons 111 to 114 is set to an outer edge of each of areas 121 to 124. Therefore, a load of the user manipulation can be reduced when the connection establishing operation is performed.

[Processing Performed by Connection Determination Unit 70]

In the first embodiment, connection determination unit 70 performs the following processing under the control of CPU 20. For example, the processing is periodically repeated from the beginning to the end of the connection establishing operation.

Figure 13:
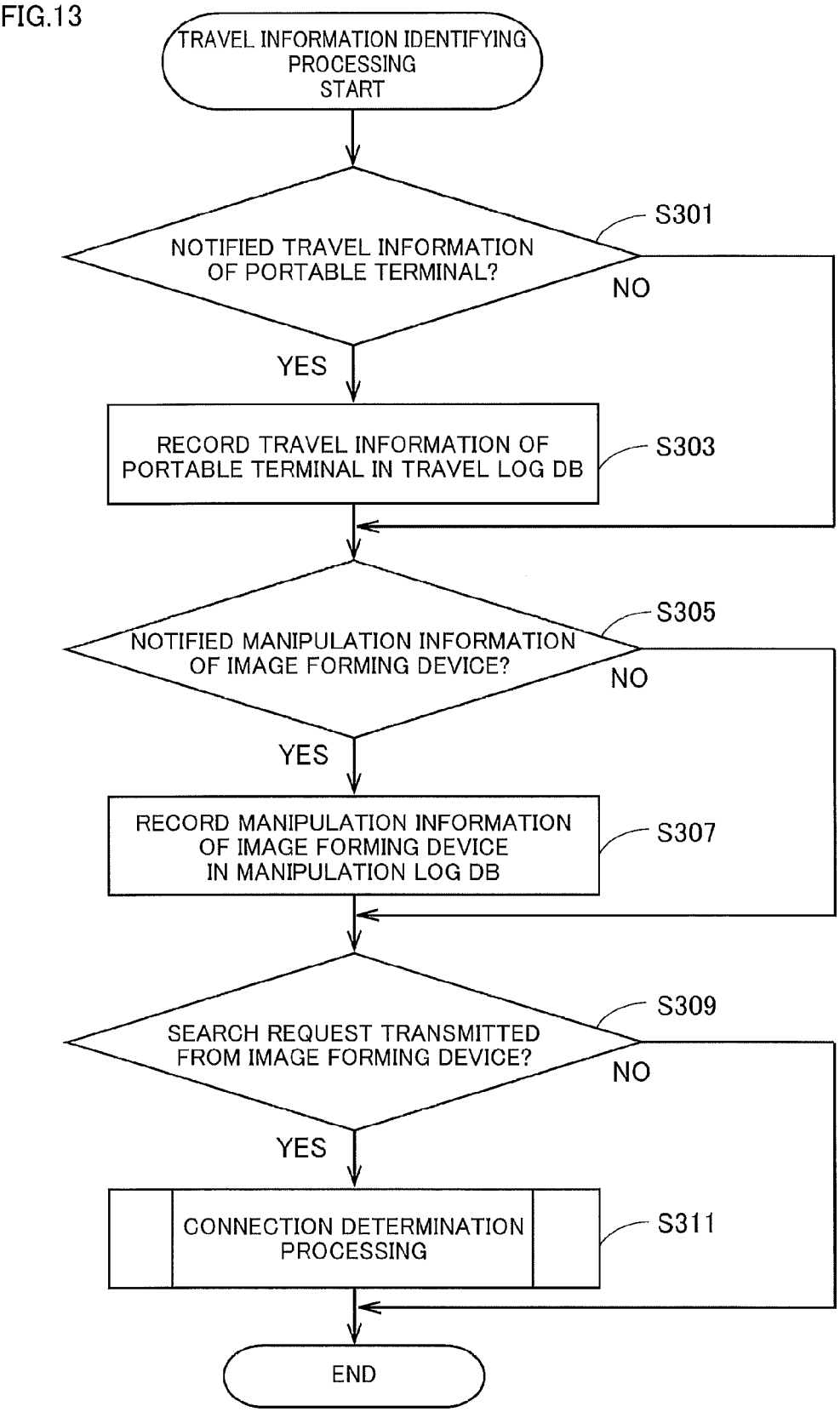
FIG. 13 is a flowchart illustrating travel information identifying processing.

FIG. 13 is a flowchart illustrating travel information identifying processing.

As illustrated in FIG. 13, in Step S301, connection determination unit 70 determines whether connection determination unit 70 is notified by portable terminal 401 of the travel information. When connection determination unit 70 is not notified by portable terminal 401 of the travel information, the flow goes to processing in Step S305.

When connection determination unit 70 is notified by portable terminal 401 of the travel information in Step S301, connection determination unit 70 records the notified travel information on portable terminal 401 as the travel log in travel log database 71 in Step S303.

In Step S305, connection determination unit 70 determines whether connection determination unit 70 is notified by image forming device 1 of the manipulation information on display panel 13. When connection determination unit 70 is not notified by image forming device 1 of the manipulation information on display panel 13, the flow goes to processing in Step S309.

When connection determination unit 70 is notified by image forming device 1 of the manipulation information on display panel 13 in Step S305, connection determination unit 70 records the notified operation information on image forming device 1 in manipulation log database 72 in Step S307.

In Step S309, connection determination unit 70 determines whether the search request is transmitted from image forming device 1. When the search request is not transmitted in Step S309, the sequence of pieces of processing is ended.

When the search request is transmitted in Step S309, connection determination unit 70 performs connection determination processing in Step S311.

There is no particular limitation to the orders of the pieces of processing in Steps S301 and S303, the pieces of processing in Steps S305 and S307, and the pieces of processing in Steps S309 and S311.

Figure 14:
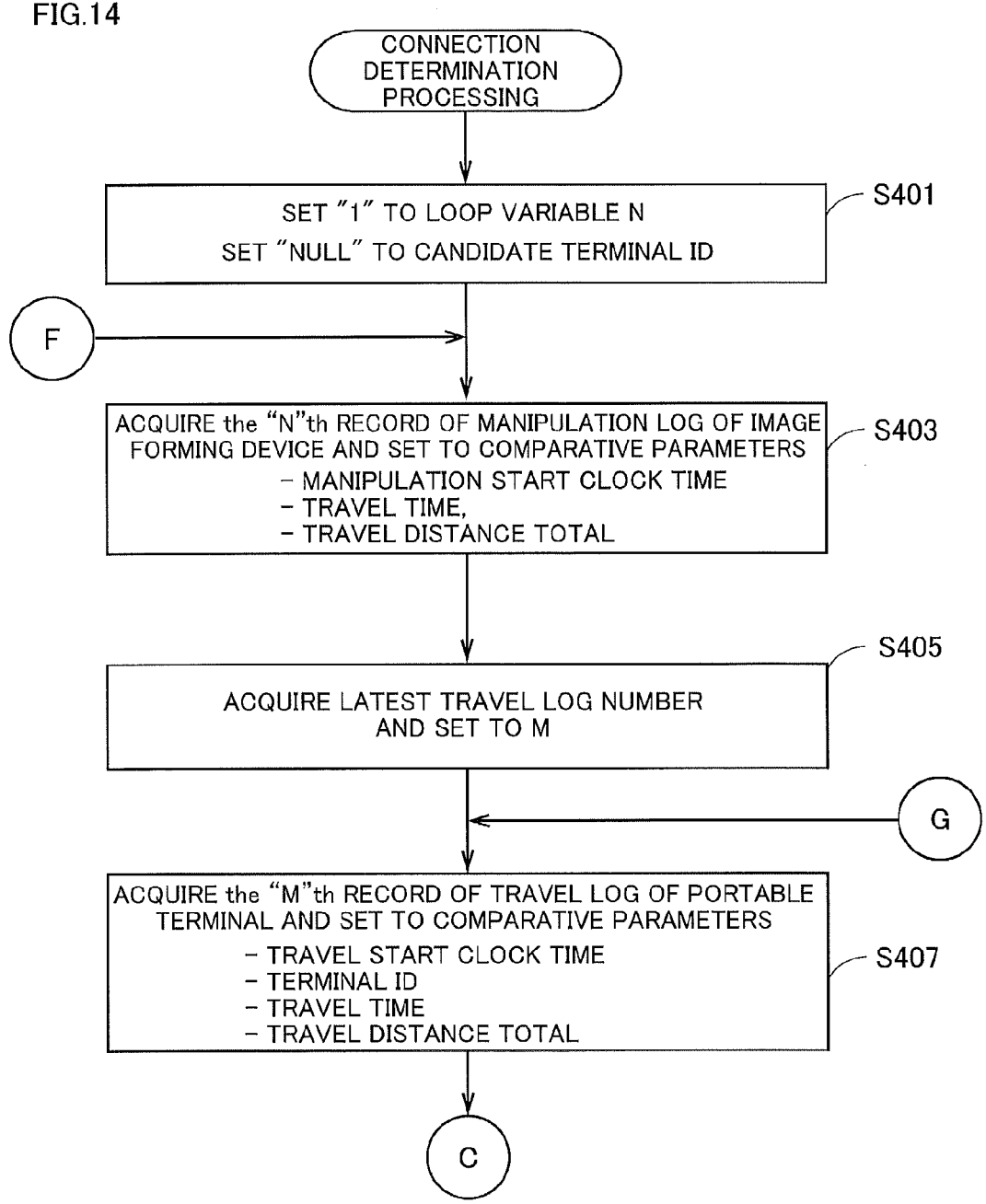
FIGS. 14 to 16 are flowcharts illustrating connection determination processing.
Figure 15:
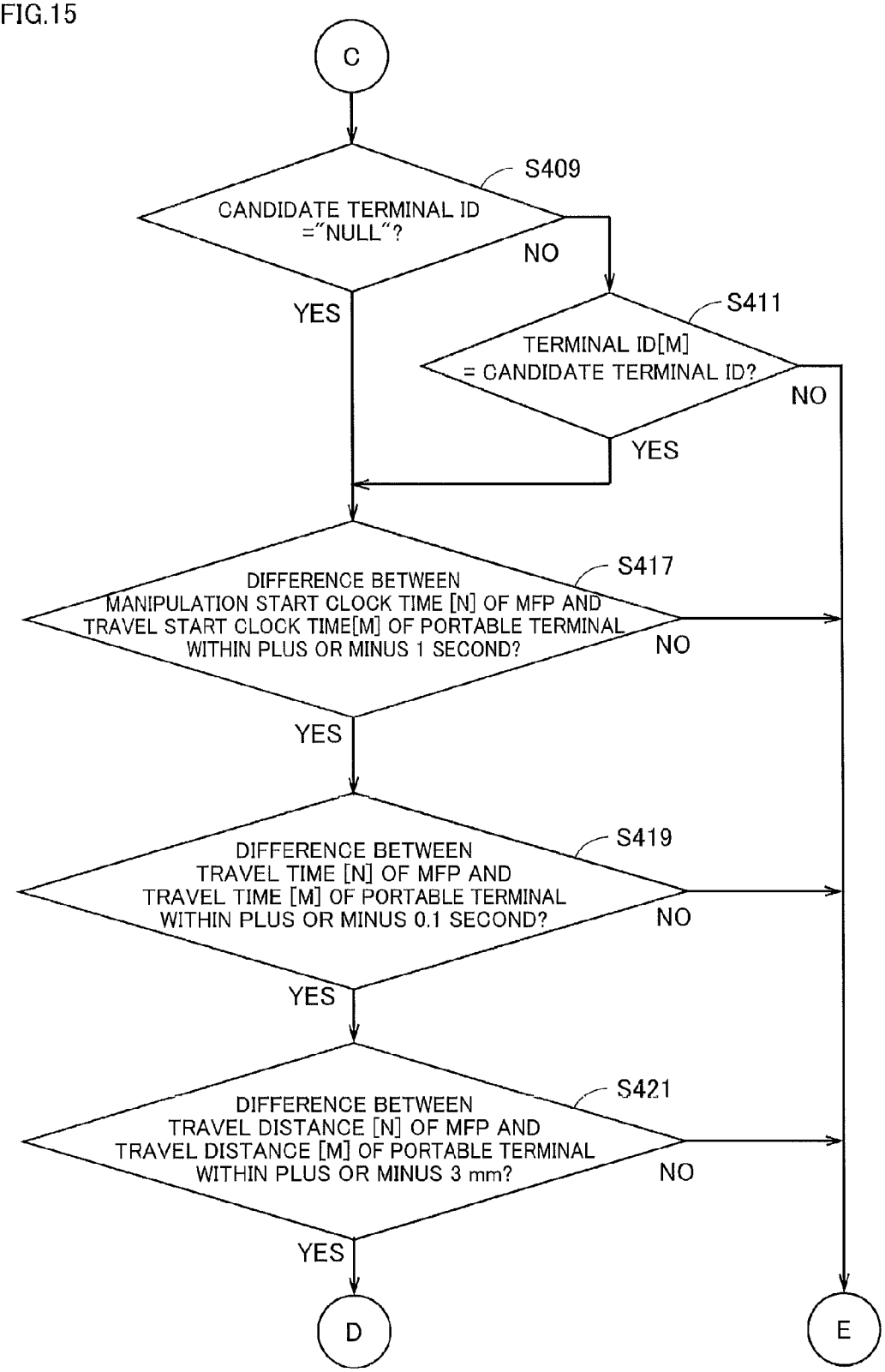
Figure 16:
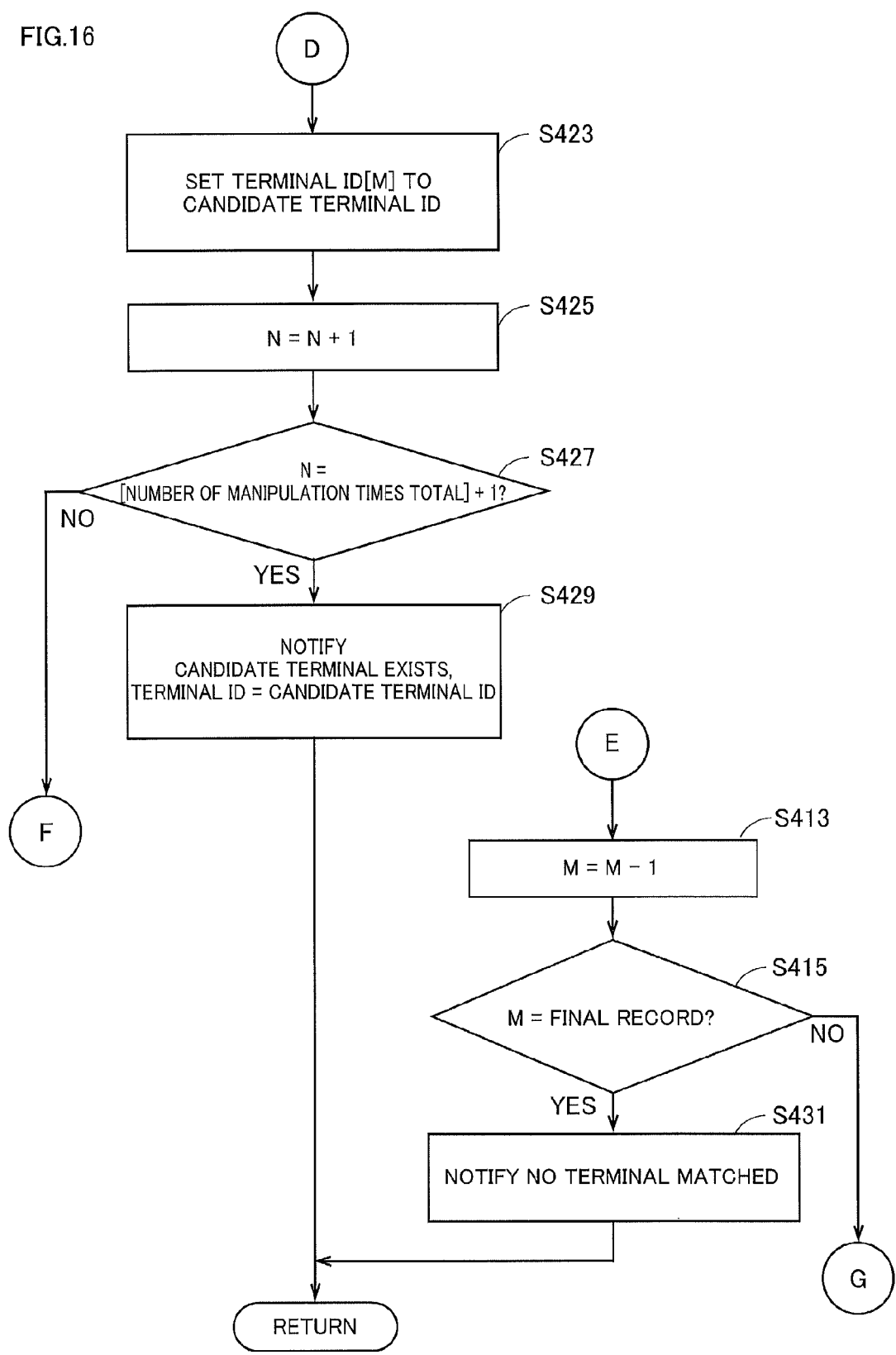

FIGS. 14 to 16 are flowcharts illustrating the connection determination processing.

As illustrated in FIG. 14, in Step S401, connection determination unit 70 sets "1" to N that is a loop variable. Loop variable N indicates a reference destination of manipulation log database 72 in the next processing. Connection determination unit 70 also sets a candidate terminal ID to "Null". The candidate terminal ID is a terminal ID of a portable terminal that becomes a candidate to which the connection is established.

In Step S403, connection determination unit 70 refers to manipulation log database 72 to acquire an Nth record of the manipulation log of image forming device 1, namely, Nth manipulation log. For example, in the acquired manipulation log, connection determination unit 70 sets the manipulation start clock time, the travel time, and travel distance Total as comparative parameters.

In Step S405, connection determination unit 70 refers to travel log database 71 to acquire the latest travel log number. Connection determination unit 70 sets the acquired value to M that is the loop variable. Loop variable M indicates a reference destination of travel log database 71 in the next processing.

In Step S407, connection determination unit 70 refers to travel log database 71 to acquire an Mth record of the travel log of portable terminal 401. For example, in the acquired travel log, connection determination unit 70 sets the travel start clock time, the terminal ID, the travel time, and travel distance Total as comparative parameters.

As illustrated in FIG. 15, in Step S409, connection determination unit 70 determines whether candidate terminal ID is "Null".

When candidate terminal ID is not "Null" in Step S409, connection determination unit 70 determines whether a terminal ID[M] (the terminal ID of the travel log of the Mth record) is matched with the candidate terminal ID in Step S411.

When terminal ID [M] is not matched with the candidate terminal ID in Step S411, as illustrated in FIG. 16, connection determination unit 70 substitutes "M−1" for loop variable M in Step S413. That is, the travel log referred to in the following processing is set to the previous travel log.

In Step S415, connection determination unit 70 determines whether the travel log acquired in Step S407 is the final record as a comparative target. That is, connection determination unit 70 determines whether the travel log acquired in Step S407 is the latest record recorded in travel log database 71. When the travel log is not the latest record, the flow returns to the processing in Step S407.

On the other hand, as illustrated in FIG. 15, when the candidate terminal ID is not "Null" in Step S409, or when the terminal ID [M] is matched with the candidate terminal ID in Step S411, processing in Step S417 is performed. In Step S417, connection determination unit 70 makes a determination. That is, in Step S417, connection determination unit 70 compares a manipulation start clock time[N] (the manipulation start clock time of the manipulation log of the Nth record) of image forming device 1 to a travel start clock time[M] (the travel start clock time of the travel log of the Mth record) of portable terminal 401. Connection determination unit 70 determines whether a difference between manipulation start clock time and travel start clock time falls within a predetermined duration, for example, the difference falls within plus or minus 1 second. That is, when the difference between the manipulation start clock time and the travel start clock time falls within the predetermined duration, connection determination unit 70 considers that the manipulation start clock time and the travel start clock time are identical to each other, and the flow goes to the determination of the travel time or the determination of the travel distance. Thus, the determination is made with the processing duration between the clock time sensed on the side of image forming device 1 and the clock time sensed on the side of portable terminal 401. Therefore, even if an error is generated between the clock time sensed on the side of image forming device 1 and the clock time sensed on the side of portable terminal 401, or even if it takes a long time to perform information communication processing, those can be permitted, and a mistaken determination can be prevented.

When the difference between the manipulation start clock time and the travel start clock time falls within the predetermined duration in Step S417, connection determination unit 70 compares a travel time[N] of image forming device 1 to a travel time[M] of portable terminal 401 in Step S419. Connection determination unit 70 determines whether the difference between travel time[N] and travel time[M] falls within a predetermined value, for example, the difference falls within plus or minus 0.1 second.

When the difference between travel time[N] and travel time[M] falls within the predetermined value in Step S419, connection determination unit 70 compares a travel distance [N] of image forming device 1 to travel distance[M] of portable terminal 401 in Step S421. Connection determination unit 70 determines whether the difference between travel distance[N] and travel distance[M] falls within a predetermined value, for example, the difference falls within plus or minus 3 millimeters.

When the difference between travel distance[N] and travel distance[M] falls within the predetermined value in Step S421, the flow goes to processing in Step S423. On the other hand, when the difference between the manipulation start clock time and the travel start clock time does not fall within the predetermined time in Step S417, when the difference between the manipulation start clock time and the travel start clock time does not fall within the predetermined value in Step S419, or when the difference between the travel distances does not fall within the predetermined value in Step S421, the flow goes to processing in Step S413. This is because, in such cases, the terminal corresponding to the travel log does not correspond to image forming device 1 in which the manipulation is performed.

As illustrated in FIG. 16, in Step S423, connection determination unit 70 sets terminal ID [M] to the candidate terminal ID. Through the determinations in Steps S417 to S421, portable terminal 401 corresponding to the travel log of the Mth record can probably be determined to be one used in the manipulation performed in image forming device 1. Accordingly, the terminal ID of portable terminal 401 is set to the candidate terminal ID.

In Step S425, connection determination unit 70 substitutes "N+1" for loop variable N. That is, the travel log referred to in the following processing is set to the subsequent travel log.

In Step S427, connection determination unit 70 determines whether loop variable N is equal to a value in which 1 is added to the total number of manipulation times transmitted together with the search request. When loop variable N is not equal to the value, namely, when there is the manipulation log that is not compared with the travel log yet, the flow returns to the processing in Step S403.

When loop variable N is equal to "the total number of manipulation times+1" in Step S427, connection determination unit 70 provides the next notification to image forming device 1 in Step S429. That is, connection determination unit 70 notifies image forming device 1 that there is the candidate terminal that becomes the connection target, and that the terminal ID of the candidate terminal is the candidate terminal ID in the above processing. Therefore, image forming device 1 can specify portable terminal 401 to which the connection should be established, and establish the connection to portable terminal 401. In other words, connection determination unit 70 notifies image forming device 1 of these pieces of information to establish the connection between image forming device 1 and portable terminal 401. The notification may be provided to both image forming device 1 and portable terminal 401.

When the travel log is the final record in Step S415, the processing in Step S431 is performed. In Step S431, connection determination unit 70 notifies image forming device 1 that there is no terminal in which the travel is matched with the manipulation performed to image forming device 1. That is, the notification indicates that the terminal, which is matched as the other side of the connection to image forming device 1, does not exist. The notification may be provided to both image forming device 1 and portable terminal 401.

When the notification is provided in Step S429, or when the notification is provided in Step S431, connection determination unit 70 ends the connection determination processing, and the flow returns to the processing in FIG. 13.

The connection determination processing is not limited to the above algorithm. In the connection determination processing, the travel log and the manipulation log of databases 71 and 72 may be compared to specify portable terminal 401 that is considered to be matched with the operation by the user.

In the connection determination processing, for example, the travel distance in the X-axis direction or the travel distance in the Y-axis direction may be compared in addition to the total travel distance (travel distance Total) of manipulation position or portable terminal 401 or instead of the total travel distance. At this point, in the travel distance of portable terminal 401, connection determination unit 70 may compare the information on the biaxial direction (X-axis direction and Y-axis direction) corresponding to the two-dimensional positional information on display panel 13 to the travel distance of the manipulation position.

In the connection determination processing, the positional information on image forming device 1 may be compared to the positional information on portable terminal 401. Therefore, the manipulation log and the travel log can be checked against each other with higher accuracy. For example, the connection determination processing can securely and rapidly be performed by narrowing the candidate terminal of the connection target to the terminals located within a predetermined range away from the position of image forming device 1.

The operation, which is performed during the connection determination processing when the manipulation log and the travel log are recorded in databases 71 and 72 as illustrated in FIGS. 8 and 11, will be described below. In the following description, the appended step number corresponds to the number in FIGS. 14 to 16.

The manipulation log having the manipulation log number "1" illustrated in FIG. 11 is acquired, and set to the comparative parameter to become the comparative target (S403). The travel log having the travel log number "242" illustrated in FIG. 11, that is the latest travel log, is acquired to become the comparative target (S405 and S407). The manipulation start clock time and the travel start clock time, the travel times, and the travel distances Total are compared in the acquired manipulation log and travel log (S417 to S421). Because the manipulation start clock time and the travel start clock time, the travel times, and the travel distances Total are matched in the manipulation log and the travel log, the terminal ID "ABC0001" of the travel log is set to the candidate terminal ID (S423).

Then the manipulation log having the manipulation log number "2" is acquired to become the comparative target (S425 and S403). The travel log having the travel log number "242" is acquired to become the comparative target (S405 and S407). At this point, because "ABC0001" is set to the candidate terminal ID, NO is made in Step S409, YES is made in Step S411, and the comparison is performed in Step S417. Because NO is made in Step S417, NO is made in Steps S413 and S415, and the travel log having the travel log number "241" becomes the comparative target (S407). In the travel log having the travel log number "241", the terminal ID differs from the candidate terminal ID. That is, NO is made in Step S409, NO is made in Step S411, and the travel start clock times are not compared in the travel log and the manipulation log. Therefore, the next travel log having the travel log number "240" is acquired as the comparative target (S413, NO in S415, and S407). The terminal ID of the travel log is matched with the candidate terminal ID (NO in S409 and YES in S411), the travel log is compared to the manipulation log (YES in S417, YES in S419, and YES in S421). Because the travel log is matched with the manipulation log in Steps S417, S419, and S421, the next manipulation log is compared to the travel log through the setting of the candidate terminal ID (S423).

The same comparison is performed to the manipulation log having the manipulation log number "3". That is, the comparison in Step S417 is performed to the travel log having the matched terminal ID in the reverse chronological order. In the first embodiment, through the comparison in Steps S417, S419, and S421, the travel log having the travel log number "237" is found as the travel log in which the comparative parameter is matched with that of the manipulation log.

When the travel log in which the comparative parameter is matched with that of the manipulation log having the total manipulation log number "3" exists, loop variable N becomes 4 in Step S425. At this point, the number of manipulation times is 3, and loop variable N is equal to the value in which 1 is added to the total number of manipulation times. Accordingly, the flow goes to the processing in Step S429, the notification that the candidate terminal exists and the notification that the candidate terminal has the terminal ID "ABC0001" are provided.

In the first embodiment, the manipulation information on the manipulation performed in image forming device 1 is compared to the travel information sensed by portable terminal 401. When the manipulation information is matched with the travel information (when the manipulation information and the travel information are derived from the same manipulation), the connection between image forming device 1 and portable terminal 401 is established to be able to conduct wireless communication. The connection establishing operation is performed by the easily practicable manipulation in which the user traces display panel 13 with the finger holding portable terminal 401. Accordingly, while the security is maintained, the user can securely establish the connection between image forming device 1 and portable terminal 401 by the simple manipulation.

The user manipulation is performed according to the display of slide pattern 110. Accordingly, portable terminal 401 that can be connected to image forming device 1 can be identified by the simple processing procedure. The user can intuitively perform the manipulation while viewing slide pattern 110.

Conventionally, there is well known portable terminals, which are connected to each other when the portable terminals are brought into contact with each other after put into a predetermined connection waiting state. The connection is performed such that the portable terminals close to each other determine the connection waiting state by checking pieces of information on the contact position and the clock time through a server. However, in the conventional method, possibly the determination that the devices can cooperate with each other is mistakenly made when the same manipulation is accidentally performed in the device close to each other. On the other hand, in the first embodiment, the user can easily perform the manipulation, and the connection to the other side can securely and properly be established such that the sufficiently complicated manipulation is performed in order to identify the other side of the connection.

In the first embodiment, it is only necessary to provide motion sensor 441 in portable terminal 401, but it is not necessary to provide motion sensor 441 in image forming device 1. Accordingly, image forming system 500 that establishes the connection by the above method can be constructed at low cost.

When the connection establishing operation is performed, image forming device 1 performs the user authentication to the user who is previously registered with respect to portable terminal 401. Accordingly, the user can perform the user authentication by the simple manipulation. After securely identifying the user, image forming device 1 can perform the user authentication based on portable terminal 401 held by the user.

[Display Appearance of Slide Pattern]

In the first embodiment, for example, plural kinds of slide patterns are displayed according to the number of portable terminals 401 existing near image forming device 1. Screen controller 17 generates the slide pattern such that the slide pattern guides the user in performing the manipulation input having the complexity corresponding to the number of portable terminals 401 existing near image forming device 1.

At this point, for example, the number of manipulation times required for the user to perform can be cited as an example of the complexity. That is, when the number of necessary manipulation times is relatively large, it is said that the manipulation input has the relatively high complexity.

Figure 17:
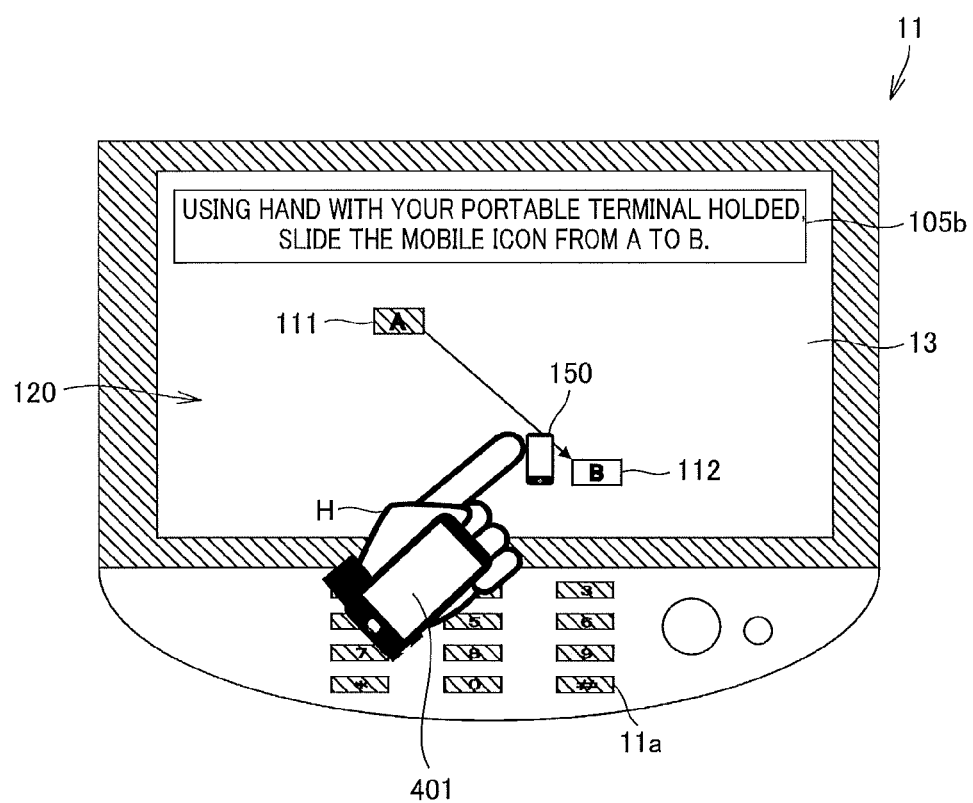
FIG. 17 is a view illustrating a display screen example of the display panel when the number of portable terminals around the image forming device is relatively small.

FIG. 17 is a view illustrating a display screen example of display panel 13 when the number of portable terminals around image forming device 1 is relatively small.

When the number of portable terminals 401 around image forming device 1 is relatively small, a simple slide pattern 120 and a corresponding message 105*b* are displayed as illustrated in FIG. 17. Slide pattern 120 and message 105*b* are displayed such that the connection establishing operation is completed when the relatively simple manipulation input is performed. Slide pattern 120 includes only first button 111 and second button 112 as the identification button. When slide pattern 120 is displayed, the manipulation input of the user may be performed only once such that the user touches first button 111 to slide the fingertip to second button 112.

Figure 18:
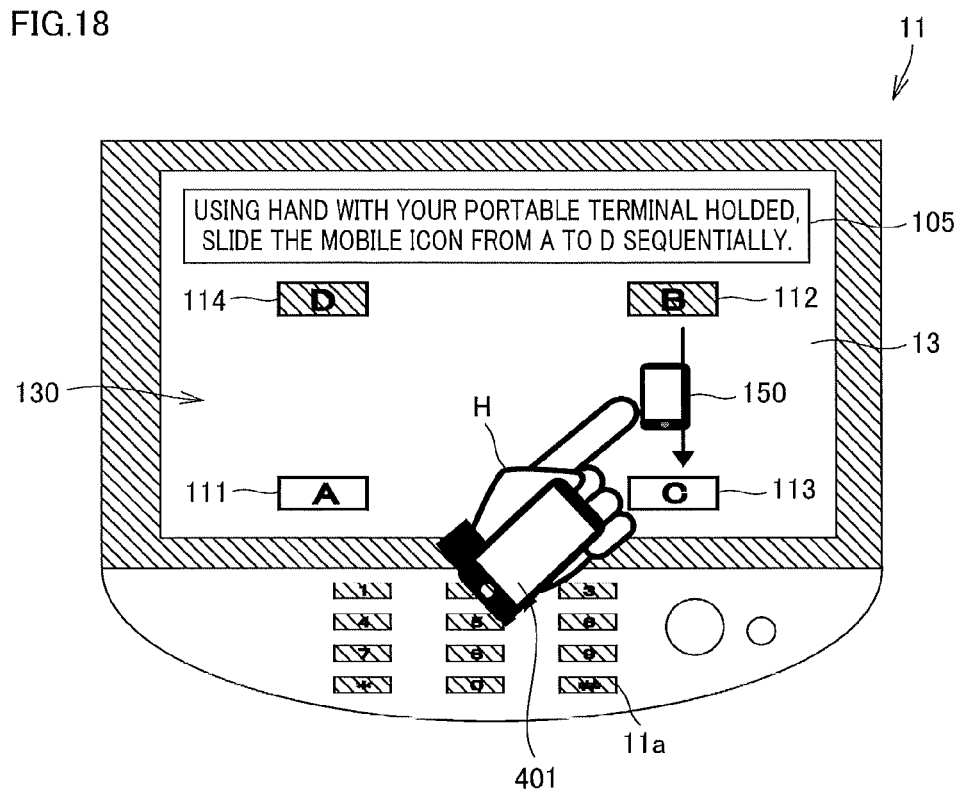
FIG. 18 is a view illustrating a display screen example of the display panel when the number of portable terminals around the image forming device is relatively large.

FIG. 18 is a view illustrating a display screen example of display panel 13 when the number of portable terminals around image forming device 1 is relatively large.

When the number of portable terminals 401 around image forming device 1 is relatively large, a relatively complicated slide pattern 130 and corresponding message 105 are displayed as illustrated in FIG. 18. Slide pattern 130 and message 105 are displayed such that the connection establishing operation is completed when the relatively complicated manipulation input is performed. Slide pattern 130 includes first button 111, second button 112, third button 113, and fourth button 114 as the identification button. When slide pattern 130 is displayed, it is necessary for the user to perform the manipulation input three times. Compared with slide pattern 120 in FIG. 17, in slide pattern 130, it is necessary for the user to perform the manipulation input as many as three times. In other words, slide pattern 130 has the complexity higher than that of slide pattern 120, and corresponds to the manipulation input having the higher complexity.

The manipulation input performed by the user becomes more complicated with increasing number of portable terminals 401 around image forming device 1, which allows reduction of a possibility of detecting another terminal that performs the same travel. Accordingly, the mistaken establishment of the connection to another terminal can be avoided. When the number of portable terminals 401 around image forming device 1 is too large to relatively identify portable terminal 401 of the other side of the connection, portable terminal 401 to be connected can securely be identified by increasing the number of manipulation times, namely, the number of checking times. Accordingly, the connection to portable terminal 401 can securely be established. On the other hand, when the number of portable terminals 401 around image forming device 1 is small to easily identify portable terminal 401 of the other side of the connection, the connection establishing operation can be performed by the easier manipulation.

As illustrated in FIG. 18, slide pattern 130 includes identification buttons 111 to 114 similarly to slide pattern 110. On the other hand, in slide pattern 130, the array of identification buttons 111 to 114 is complicated compared with slide pattern 110. In slide pattern 110, each manipulation is horizontally or vertically performed with respect to display panel 13. On the other hand, slide pattern 130 includes the slide manipulation in the direction that is not horizontal or vertical to display panel 13. Thus, slide pattern 130 is configured such that the manipulation pattern (such as the travel direction of the manipulation position) is complicated even in the same number of manipulation times. Therefore, the user manipulation becomes more unique in performing the connection establishing operation. Accordingly, the portable terminal relating to the connection establishing operation is easily distinguished from another portable terminal around image forming device 1, and the connection to portable terminal 401 to be connected can securely be established.

[Modification of Connection Establishing Operation]

Figure 19:
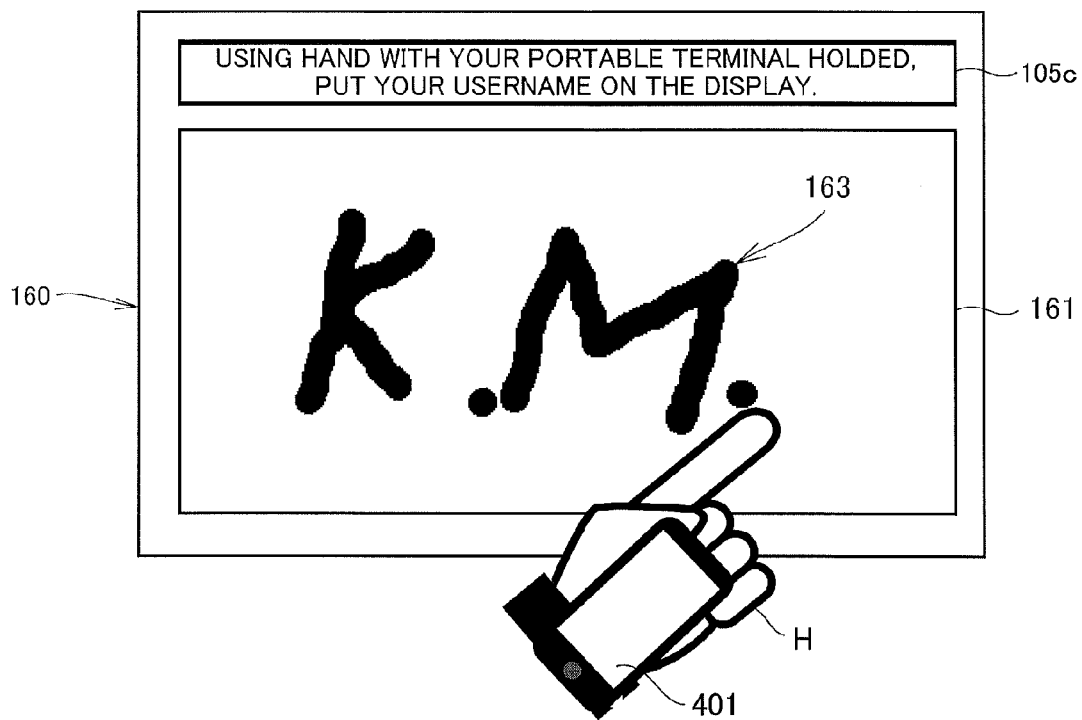
FIG. 19 is a view illustrating a display screen example of a display panel according to a modification of the connection establishing operation.

FIG. 19 is a view illustrating a display screen example of display panel 13 according to a modification of the connection establishing operation.

As illustrated in FIG. 19, in the modification, a connection screen 160 is displayed on display panel 13 when the connection establishing operation is performed. Connection screen 160 includes a message 105*c* and a signature field 161. A guide announcement that encourages the user to sign user's name with user's hand while the user holds portable terminal 401 is displayed in message 105*e*. For example, signature field 161 is a blank image that is provided such that the user can manipulate an arbitrary position. A locus of the manipulation position of the user is displayed as a signature 163 in signature field 161.

When connection screen 160 is displayed in performing the connection establishing operation, the user inputs predetermined signature 163 to signature field 161 with the fingertip while holding portable terminal 401. When signature 163 is input, the manipulation information detected by image forming device 1 in signing the name and the travel information detected by portable terminal 401 in signing the name are transmitted to connection determination unit 70. Connection determination unit 70 compares predetermined pieces of information in the manipulation information and the travel information. Connection determination unit 70 determines whether the predetermined pieces of information are matched with each other, namely, whether the manipulation of image forming device 1 and the travel of portable terminal 401 are detected in association with the same manipulation of the user. Therefore, the connection between image forming device 1 and portable terminal 401 can be established.

At this point, CPU 20 of image forming device 1 may specify the user who writes signature 163 by performing character recognition processing to signature 163 written by the user. Based on the information on the manipulation input, CPU 20 of image forming device 1 may determine whether signature 163 corresponds to information that is previously registered as the signature corresponding to the user, and perform the user authentication according to the determination result. CPU 20 may perform the user authentication according to a degree of coincidence of the image expressing signature 163 with the previously-registered image. At this point, CPU 20 can identify the user using the user's name and the configuration of signature 163. Accordingly, while the high security is maintained, the user authentication can be performed by the simple manipulation without inputting the password of the user.

Figure 20:
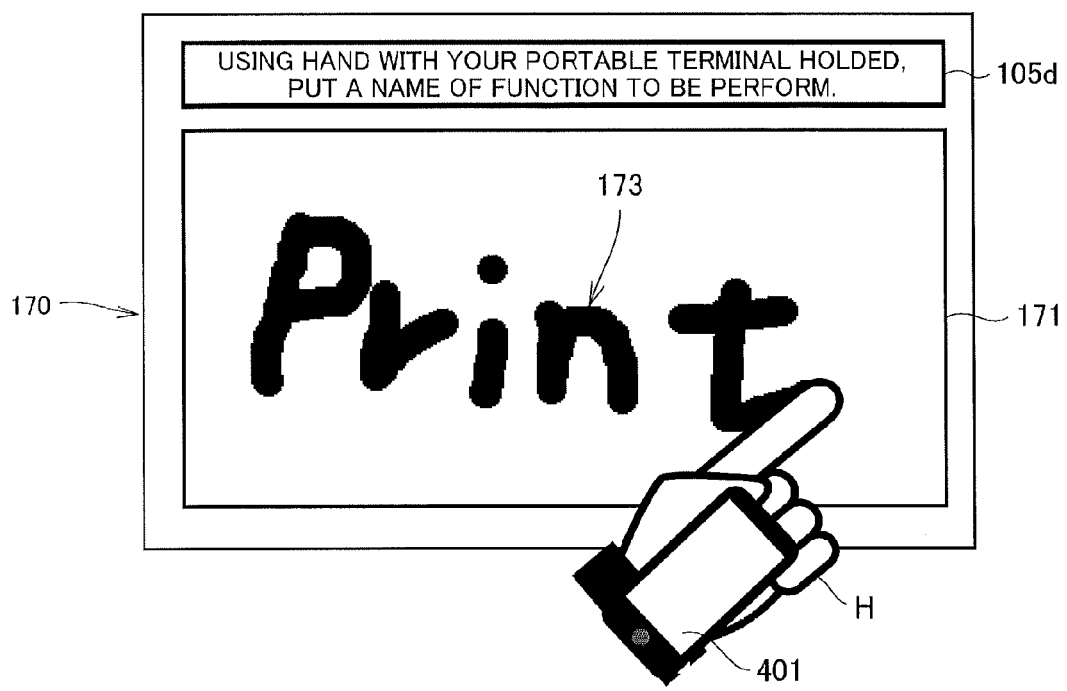
FIG. 20 is a view illustrating a display screen example of a display panel according to another modification of the connection establishing operation.

FIG. 20 is a view illustrating a display screen example of display panel 13 according to another modification of the connection establishing operation.

As illustrated in FIG. 20, in another modification, a connection screen 170 is displayed on display panel 13 when the connection establishing operation is performed. Connection screen 170 includes a message 105d and a signature field 171. A guide announcement that encourages the user to write a signature corresponding to the function, which is performed in image forming system 500, with user's hand holding portable terminal 401 is displayed in message 105d. For example, signature field 171 is a blank image that is provided such that the user can manipulate an arbitrary position. The locus of the manipulation position of the user is displayed as signature 173 in signature field 171.

When connection screen 170 is displayed in performing the connection establishing operation, the user inputs predetermined signature 173 corresponding to the function, which is performed in image forming system 500, to signature field 171 with the fingertip while holding portable terminal 401. In the example in FIG. 20, the predetermined characters "print" corresponding to the print function are input as signature 173. When signature 173 is input, as with the input of signature 163 in the modification, connection determination unit 70 determines whether the manipulation of image forming device 1 and the travel of portable terminal 401 are detected in association with the same manipulation of the user. Therefore, the connection between image forming device 1 and portable terminal 401 can be established.

When the connection between image forming device 1 and portable terminal 401 is established, recognition processing is performed to signature 173. CPU 20 previously searches a command matched with the recognized character string (an example of the information on the manipulation input) exists in commands (an example of the registration manipulation information) corresponding to the functions that can be performed in image forming device 1. When the command matched with the recognized character string exists, CPU 20 provides an instruction to activate the function corresponding to the command, and performs the function. In the example in FIG. 20, CPU 20 of image forming device 1 performs the character recognition processing to signature 173. CPU 20 recognizes that signature 173 corresponds to the character string "print". For example, CPU 20 activates the print operation of the document transmitted from portable terminal 401 by establishing the connection.

The signature and command corresponding to the function to be performed are not limited to "print" in FIG. 20, but signatures and commands corresponding to various functions may properly be set. For example, "scan" can be set to perform the scan function, "copy" can be set to perform the copy function, and "Mail" or "FAX" can be set to perform the mail transmission function or facsimile transmission function. In order to perform the function of transmitting the information from image forming device 1 to the external device, the connection establishing operation may be performed to assign a transmission destination by inputting the signature corresponding to the transmission destination.

In another modification, the signature input by the user is not limited to the character, but the signature may be a graphic. For example, a slide manipulation corresponding to a predetermined function is previously registered, and the function may be called and performed by performing the manipulation according to a pattern of the slide manipulation.

[Modification of Subject Performing Connection Determination Processing]

In the first embodiment, the connection determination processing is performed using the connection determination unit provided in image forming device 1. However, it is not always necessary to provide the connection determination unit in image forming device 1. For example, the connection determination unit is provided on the portable terminal side or on the server that is provided separately from the image forming device and the portable terminal, and the connection determination unit may perform the connection determination processing.

Figure 21:
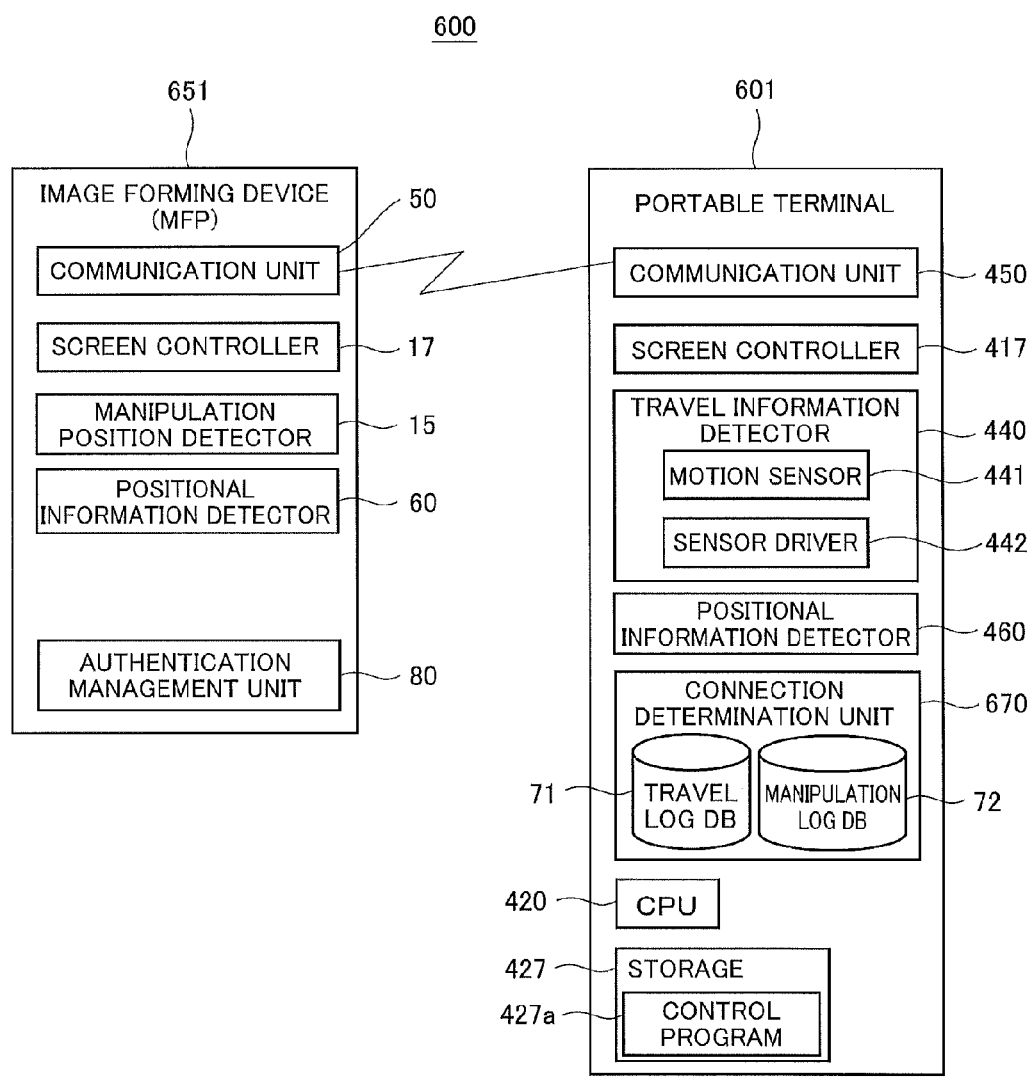
FIG. 21 is a block diagram illustrating a configuration of an image forming system according to a modification of the first embodiment.

FIG. 21 is a block diagram illustrating a configuration of an image forming system according to a modification of the first embodiment.

As illustrated in FIG. 21, an image forming system 600 includes an image forming device (an example of the information processing device) 651 and a portable terminal (an example of the portable type mobile terminal) 601. In image forming system 600, portable terminal 601 acts as the connection control device that determines whether the connection between image forming device 651 and portable terminal 601 can be established. That is, image forming system 600 differs from image forming system 500 in that the connection determination processing is performed on the side of portable terminal 601.

Portable terminal 601 includes a connection determination unit 670 in addition to each unit included in portable terminal 401 of the first embodiment. Connection determination unit 670 has the same configuration as connection determination unit 70 included in image forming device 1 of the first embodiment. Travel log database 71 and manipulation log database 72 are provided in connection determination unit 670.

Image forming device 651 has the same configuration as image forming device 1 except that connection determination unit 70 is not included.

In image forming system 600, the connection establishing operation to establish the connection between image forming device 651 and portable terminal 601 is performed as follows. At this point, the manipulation performed by the user is identical to the manipulation that is performed to perform the connection establishing operation in image forming system 500.

That is, when the connection establishing operation is performed, the manipulation information on the user manipulation performed in image forming device 651 is transmitted to portable terminal 601. The travel information on portable terminal 601 is obtained in portable terminal 601. Connection determination unit 670 acquires the manipulation information and the travel information, and records the pieces of information in databases 71 and 72. When the manipulation is ended, image forming device 651 notifies portable terminal 601 of the search request. In response to the search request, connection determination unit 670 determines whether the manipulation of image forming device 651 and the travel of portable terminal 601 are detected in association with the same manipulation of the user. When the manipulation of image forming device 651 and the travel of portable terminal 601 are detected in association with the same manipulation of the user, the notification of the determination is transmitted to at least one of image forming device 651 and portable terminal 601. Therefore, the connection between image forming device 651 and portable terminal 601 can be established.

Figure 22:
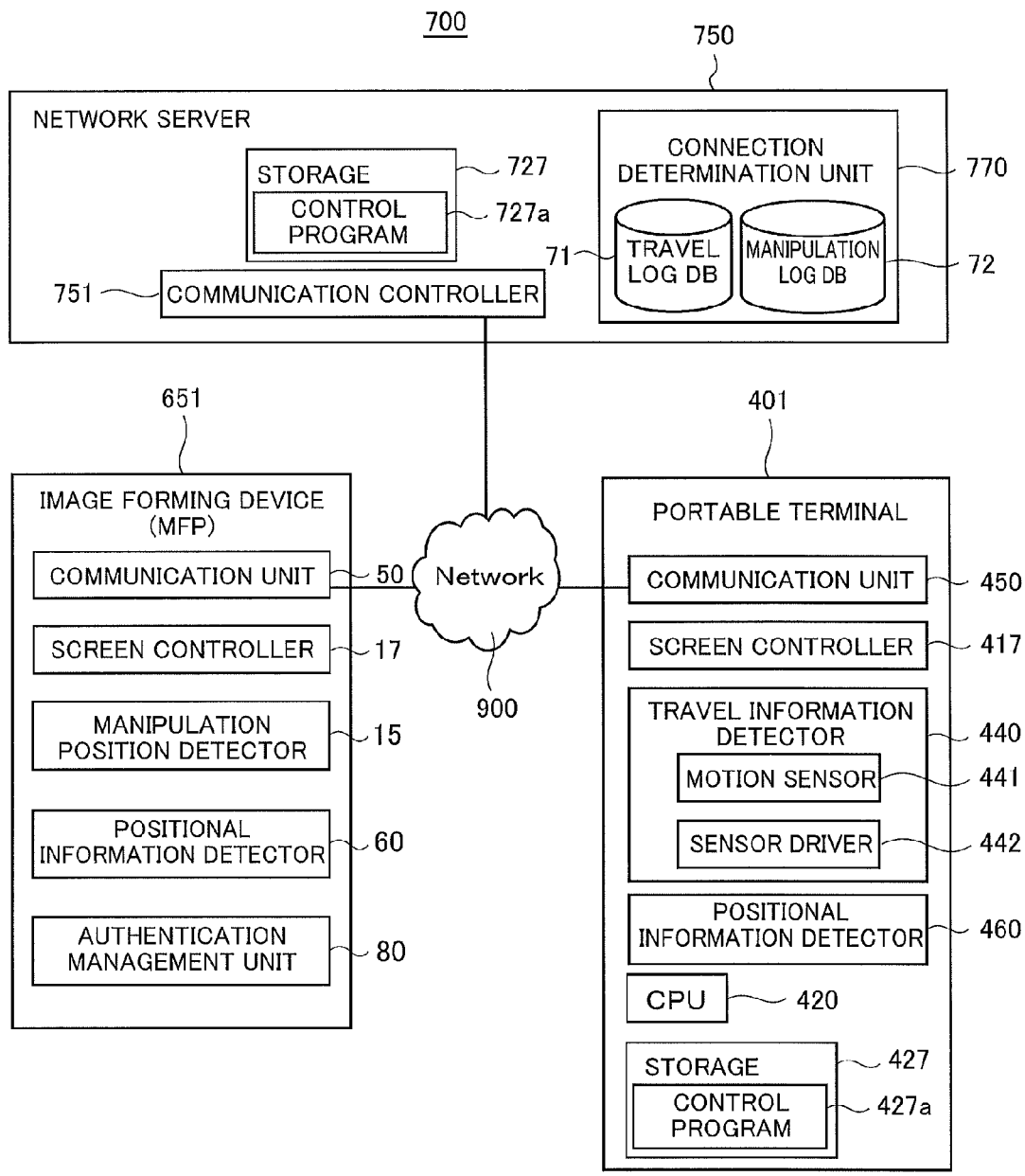
FIG. 22 is a block diagram illustrating a configuration of an image forming system according to another modification of the first embodiment.

FIG. 22 is a block diagram illustrating a configuration of an image forming system according to another modification of the first embodiment.

As illustrated in FIG. 22, an image forming system 700 includes image forming device 651, portable terminal 401, and a network server 750. Image forming device 651, portable terminal 401, and network server 750 are connected to a network 900. For example, network 900 is a LAN (Local Area Network).

In image forming system 700, for example, in order to perform the touch and print operation between image forming device 651 and portable terminal 401, it is necessary that image forming device 651 and portable terminal 401 be connected to be able to conduct wireless communication by a communication protocol (such as Bluetooth) that is different from a communication protocol used to connect each of image forming device 651 and portable terminal 401 to network 900. At this point, the connection establishing operation is performed.

In image forming system 700, network server 750 acts as the connection control device that determines whether the connection between image forming device 651 and portable terminal 401 can be established. That is, image forming system 700 differs from image forming system 500 in that the connection determination processing is performed by network server 750.

Image forming device 651 is configured similarly to the image forming device included in image forming system 600. Portable terminal 401 is configured similarly to the portable terminal included in image forming system 500.

Network server 750 includes a storage 727, a communication controller 751, and a connection determination unit 770.

For example, storage 727 is an HDD. For example, a control program 727a executed by a CPU (not illustrated) is stored in storage 727.

Communication controller 751 is a communication interface that establishes the connection to network 900. Network server 750 is connected to be able to conduct communication with each of image forming device 651 and portable terminal 401 through communication controller 751.

Connection determination unit 770 has the same configuration as connection determination unit 70 included in image forming device 1 of the first embodiment. Travel log database 71 and manipulation log database 72 are provided in connection determination unit 770.

In image forming system 700, the connection establishing operation to establish the connection between image forming device 651 and portable terminal 401 is performed as follows. At this point, the manipulation performed by the user is identical to the manipulation that is performed to perform the connection establishing operation in image forming system 500.

That is, when the connection establishing operation is performed, the manipulation information on the user manipulation performed in image forming device 651 is transmitted to network server 750. The travel information on portable terminal 401 is also transmitted to network server 750. In network server 750, connection determination unit 770 acquires the manipulation information and the travel information, and records the pieces of information in databases 71 and 72. When the manipulation is ended, image forming device 651 notifies network server 750 of the search request. In response to the search request, connection determination unit 770 determines whether the manipulation of image forming device 651 and the travel of portable terminal 401 are detected in association with the same manipulation of the user. When the manipulation of image forming device 651 and the travel of portable terminal 401 can be detected in association with the same manipulation of the user, the notification of the determination is transmitted to at least one of image forming device 651 and portable terminal 401.

Therefore, the connection between image forming device 651 and portable terminal 401 can be established. That is, connection determination unit 770 of network server 750 establishes the connection between image forming device 651 and portable terminal 401.

Second Embodiment

Like the image forming system of the first embodiment, an image forming system according to a second embodiment includes an image forming device and a portable terminal. The second embodiment differs from the first embodiment in that the image forming device includes an imaging device and that the user performs a predetermined motion gesture to establish the connection between the image forming device and the portable terminal. The same component as the first embodiment is designated by the same numeral, and the overlapping description is omitted.

Figure 23:
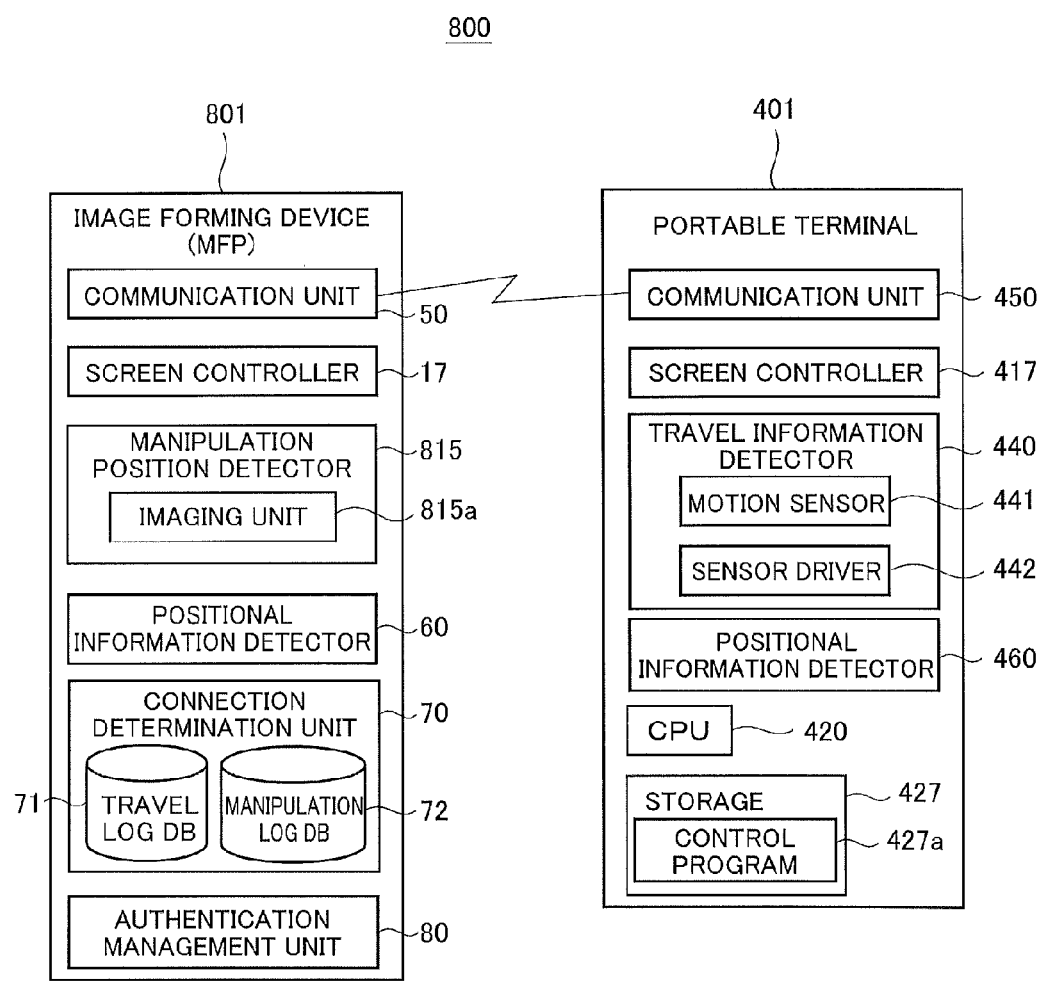
FIG. 23 is a block diagram illustrating an image forming system according to a second embodiment of the invention.

FIG. 23 is a block diagram illustrating the image forming system of the second embodiment of the invention.

As illustrated in FIG. 23, in the second embodiment, image forming system 800 includes an image forming device 801 and portable terminal 401. Portable terminal 401 has the same configuration as the first embodiment.

Image forming device 801 has the substantially same configuration as image forming device 1 of the first embodiment, and image forming device 801 includes a connection establishing device. Image forming device 801 includes an imaging unit (an example of the imaging device) 815a that is a camera as described later. Imaging unit 815a is provided in a manipulation position detector 815. Image forming device 801 is identical to image forming device 1 of the first embodiment in other points.

Manipulation position detector 815 detects the position of the manipulation input performed to image forming device 801 based on an image (including a video picture) captured by imaging unit 815a. For example, in the captured image, user's hand or the position of a predetermined marker (such as the image of the recognition target) retained by the user can be detected as the manipulation position of the user. Image forming device 801 can perform the function corresponding to the manipulation input of the user based on the position of the manipulation input of the user, which is detected by manipulation position detector 815.

In the second embodiment, when the user performs the predetermined motion gesture (an example of the manipulation input), image forming device 801 can perform the function corresponding to the motion gesture. The motion gesture includes the following motions. For example, a motion in which the marker is moved so as to draw a circle in the image, a motion in which the marker is vertically moved, a motion in which the marker is horizontally moved can be used as the motion gesture.

Figure 24:
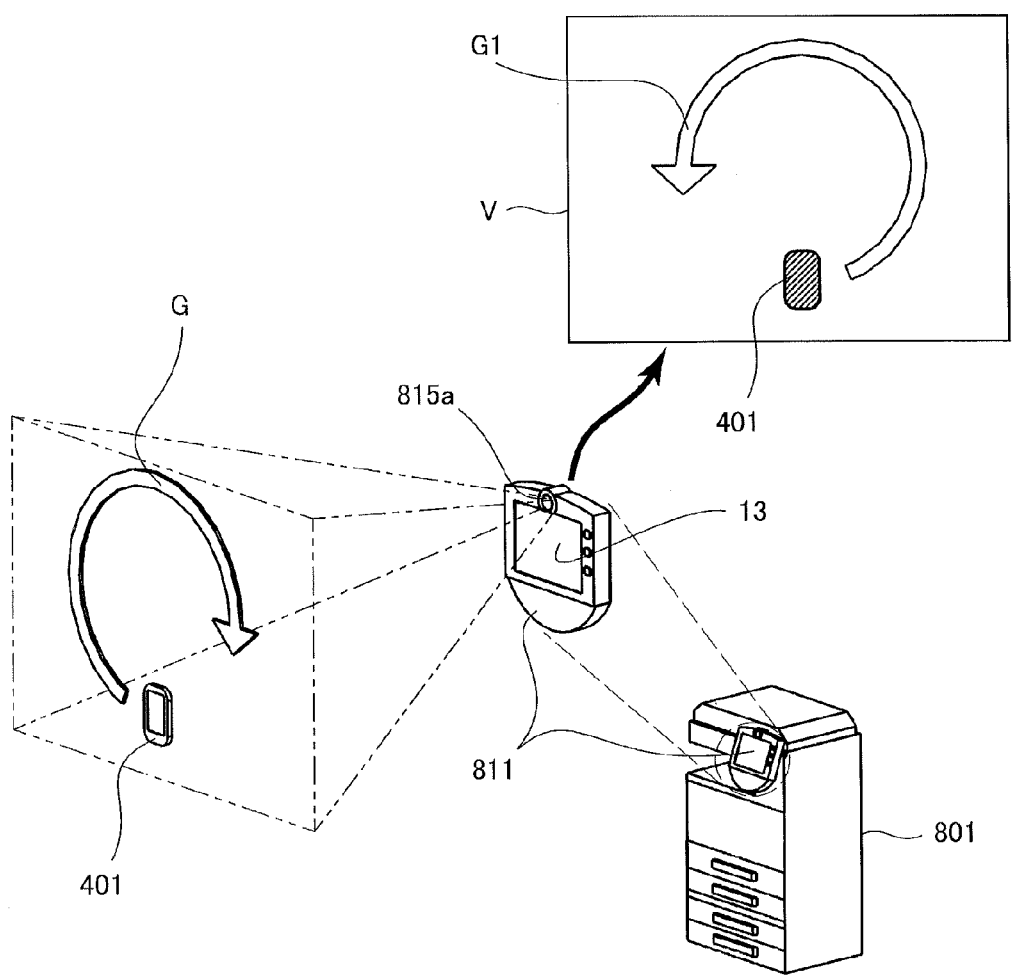
FIG. 24 is a view illustrating a connection establishing operation in the second embodiment.

FIG. 24 is a view illustrating the connection establishing operation in the second embodiment.

As illustrated in FIG. 24, imaging unit 815a is provided in a manipulation unit 811 of image forming device 801. For example, imaging unit 815a is provided in an upper portion of manipulation unit 811 so as to be oriented toward the user who faces display panel 13 of manipulation unit 811. Imaging unit 815a can capture the image of the user who performs the manipulation input to image forming device 801 such that the user faces display panel 13 to manipulate manipulation unit 811. Imaging unit 815a can capture the image of the user who performs the motion gesture in a position slightly away from display panel 13. The result of the captured image is obtained so as to be displayed as a moving image V in FIG. 24. Imaging unit 815a may capture a still image at predetermined time intervals.

In the second embodiment, the following operation may be performed to establish the connection between image forming device 801 and portable terminal 401. The user holds portable terminal 401 that is the marker, and the user performs the predetermined motion gesture to image forming device 801 with user's hand. Therefore, whether the connection is established is determined based on the information, which is acquired on the side of image forming device 801 using imaging unit 815a, and the information on the travel of portable terminal 401, which is acquired in portable terminal 401 similarly to the first embodiment.

The predetermined motion gesture includes the following motion. As illustrated by an arrow G in FIG. 24, the user moves portable terminal 401 in a counterclockwise direction (left hand turn) with respect to image forming device 801. Therefore, in moving image V captured by imaging unit 815a, a movement locus of portable terminal 401 is viewed as illustrated by an arrow G1.

When the motion gesture is performed, portable terminal 401 detects the travel information similarly to the first embodiment. The travel information is transmitted to connection determination unit 70, and recorded as the travel log.

On the other hand, in image forming device 801, the manipulation information corresponding to the motion gesture performed by the user is detected as follows. For example, the operation is performed by CPU 20 of image forming device 801. The manipulation information is also transmitted to connection determination unit 70.

Figure 25:
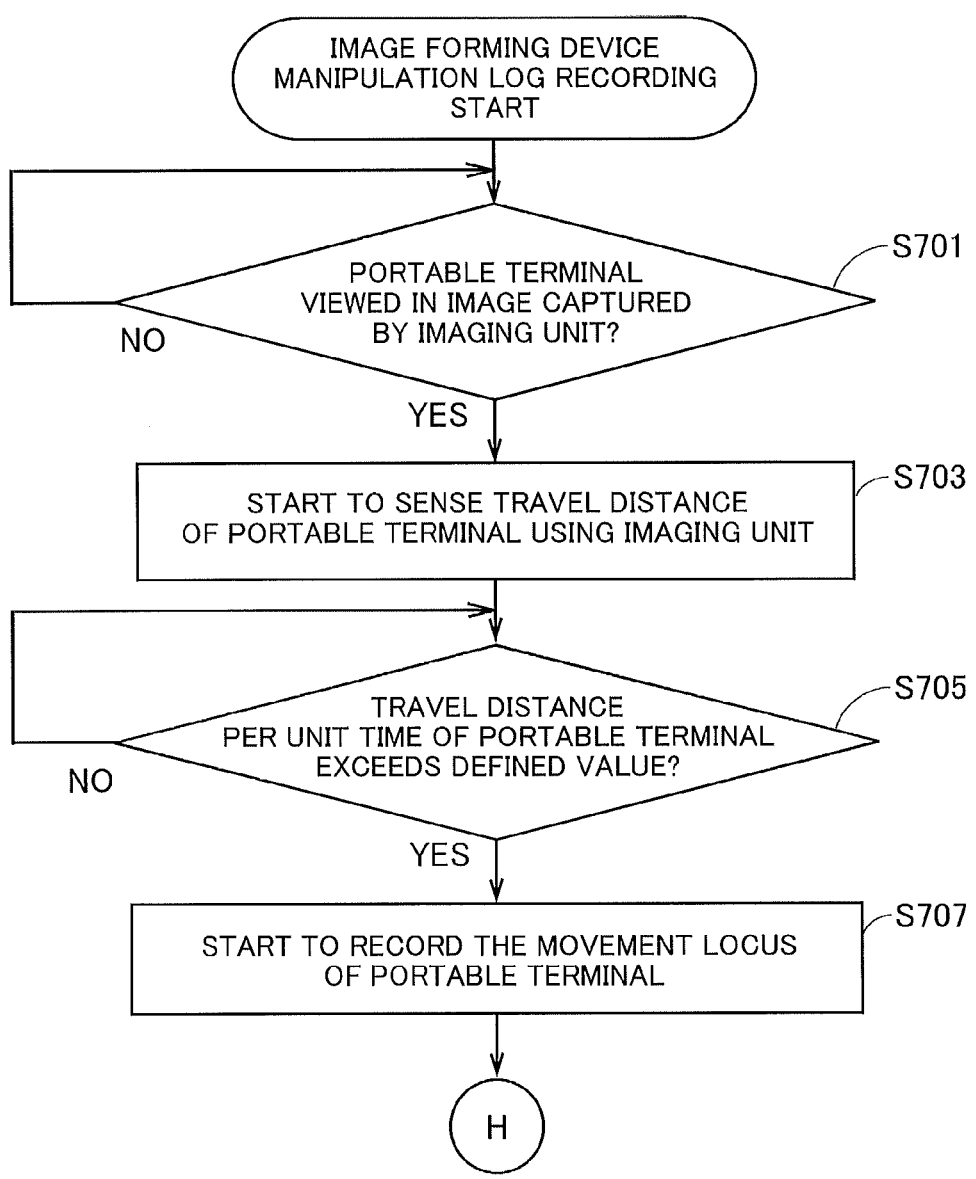
FIGS. 25 and 26 are flowcharts illustrating an operation to acquire the manipulation information on the image forming device.
Figure 26:
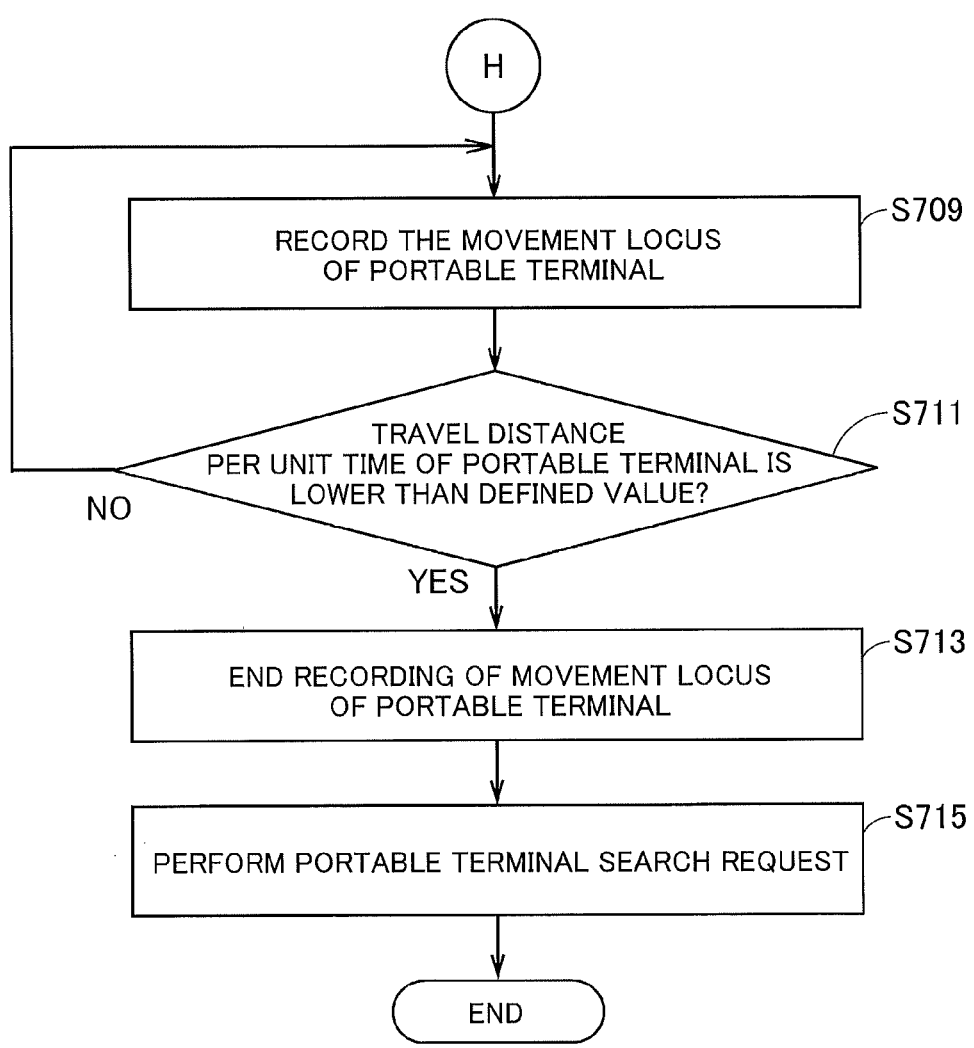

FIGS. 25 and 26 are flowcharts illustrating an operation to acquire the manipulation information on image forming device 801.

In Step S701, CPU 20 of image forming device 801 determines whether portable terminal 401 is viewed in the image (including the moving image) captured by imaging unit 815a. For example, whether portable terminal 401 is viewed in the image is determined such that image processing is performed to the captured image to determine whether a previously-registered feature indicating portable terminal 401 is included in the image. When portable terminal 401 is viewed in the image, the flow goes to Step S703.

In Step S703, CPU 20 starts to sense the travel distance per unit time of portable terminal 401 using imaging unit 815a.

In Step S705, CPU 20 determines whether the travel distance per unit time of portable terminal 401 exceeds a defined value (first defined value). When the travel distance per unit time of portable terminal 401 exceeds the defined value, the flow goes to Step S707.

A value, in which a possibility of performing the motion gesture can be determined when portable terminal 401 travels beyond a certain distance, is used as the defined value. CPU 20 may determine a distance between the user and imaging unit 815a as the travel distance of portable terminal 401, and recognize whether the travel distance per unit time of portable terminal 401 exceeds the defined value based on the image captured by imaging unit 815a.

In Step S707, CPU 20 starts to record the movement locus of portable terminal 401.

In Step S709, CPU 20 records the movement locus of portable terminal 401. The movement locus is recorded similarly to the manipulation log in the first embodiment in FIG. 11. For example, the movement locus is recorded such that the position of portable terminal 401 in the image captured by imaging unit 815a is specified at predetermined intervals in the form of a coordinate.

In Step S711, CPU 20 determines whether the travel distance per unit time of portable terminal 401 is lower than a defined value (second defined value). When the travel distance per unit time of portable terminal 401 is not lower than the defined value, CPU 20 determines that the motion gesture is continuously performed, and the processing in Step S709 is continued. When the travel distance per unit time of portable terminal 401 is lower than the defined value, the flow goes to Step S713.

The second defined value may be equal to or different from the first defined value.

In Step S713, CPU 20 ends the recording of the movement locus of portable terminal 401.

In Step S715, CPU 20 performs a portable terminal search request.

When the movement locus of portable terminal 401 is recorded to obtain the recording (manipulation log) of the manipulation information, the travel information identifying processing is performed based on the manipulation log and the travel log. Therefore, portable terminal 401 that is used in the same manipulation (motion gesture) as the manipulation log can be specified, and the connection between image forming device 801 and portable terminal 401 can be established.

Figure 27:
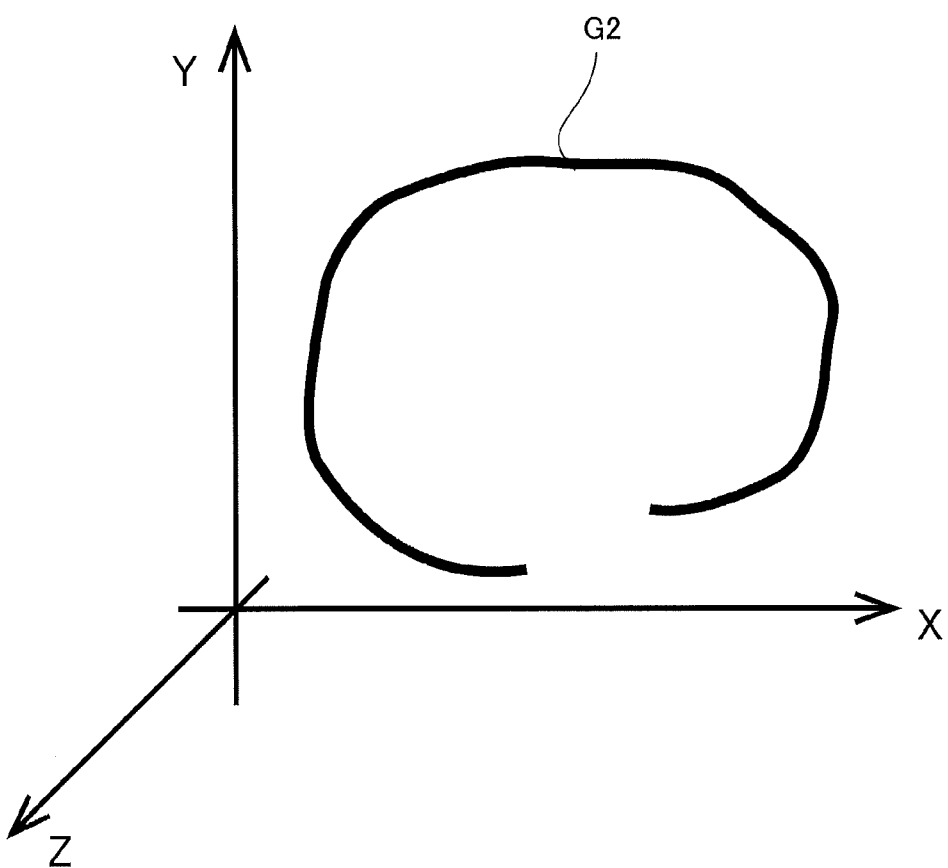
FIG. 27 is a view illustrating an example of travel information obtained from a portable terminal.
Figure 28:
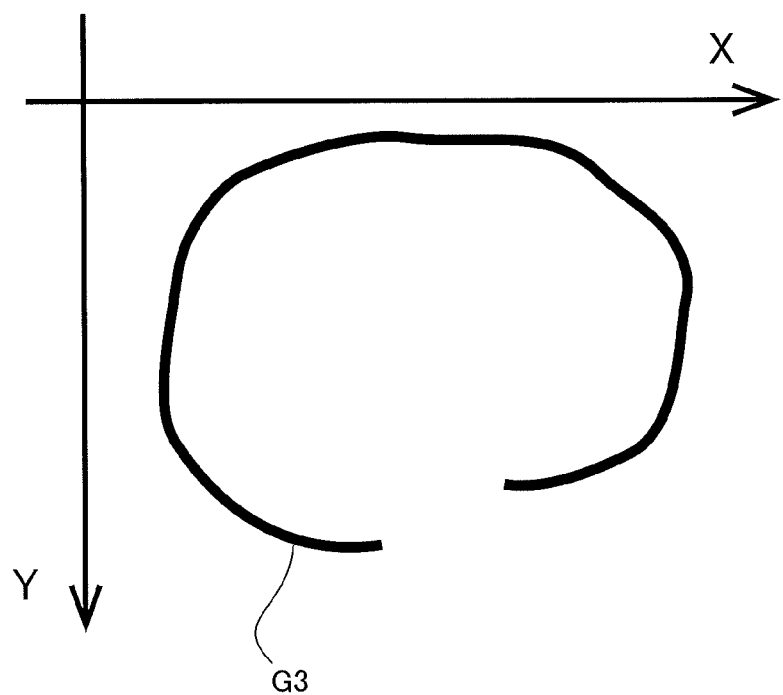
FIG. 28 is a view illustrating an example of manipulation information obtained from an imaging unit.

FIG. 27 is a view illustrating an example of the travel information obtained from portable terminal 401. FIG. 28 is a view illustrating an example of the manipulation information obtained from imaging unit 815a.

For example, when the user performs the motion gesture to establish the connection, the acquired travel information or manipulation information corresponds to the following movement locus of portable terminal 401. The travel information obtained from motion sensor 441 of portable terminal 401 corresponds to a movement locus G2 in FIG. 27. On the other hand, the manipulation information, which is captured by imaging unit 815a and detected by manipulation position detector 815, corresponds to a movement locus G3 in FIG. 28. Even if movement locus G2 and movement locus G3 are expressed by different coordinate systems, for example, movement locus G2 and movement locus G3 can be determined to be the same locus through a coordinate transformation. Therefore, connection determination unit 70 can determine whether image forming device 801 and portable terminal 401 correspond to the same manipulation.

In the second embodiment, the same effect as the first embodiment can be obtained. In the second embodiment, while the security is maintained, the user can securely establish the connection between image forming device 801 and portable terminal 401 by simply performing the motion gesture. Because motion sensor 441 may be provided only in portable terminal 401, image forming system 800 can be constructed at low cost. Image forming device 801 performs the user authentication to the user who is previously registered according to portable terminal 401, which allows the user authentication to be performed by the easy manipulation.

The motion gesture may be performed while how to perform the motion gesture is displayed on display panel 13. The user can easily perform the operation to establish the connection between image forming device 801 and portable terminal 401.

In the second embodiment, the features described in the first embodiment may also be combined.

For example, the complexity of the motion gesture establishing the connection may be changed according to the number of portable terminals 401 existing near image forming device 801. For a small number of portable terminals

401, the motion gesture can be simplified to reduce a burden of the user. On the other hand, for a large number of portable terminals 401, the motion gesture is complicated to securely specify portable terminal 401 held by the user. In this case, for example, display panel 13 may guide the user in performing the motion gesture.

For example, a motion gesture corresponding to a command to perform a specific function may be received as the motion gesture establishing the connection. In this case, once the connection to portable terminal 401 is established, image forming device 801 can perform the function corresponding to the motion gesture.

As described in the modification of the first embodiment, the server provided separately from image forming device 801 acts as the connection control device, and the image forming system may include image forming device 801, the server, and portable terminal 401. The imaging device that captures the image of the user may be provided separately from image forming device 801.

[Others]

The connection determination unit may determine the accuracy of the manipulation input performed by the user. For example, the accuracy may be determined by detecting a degree of coincidence of the manipulation to the slide pattern or a degree of coincidence to a previously-registered signature pattern. At this point, the CPU of the image forming device or the CPU of the portable terminal may perform processing according to the accuracy relating to the determined manipulation input. For example, the CPU of the image forming device can perform various kinds of control to the user who is authenticated at that time such that an image forming device use right provided by the authentication is partially restricted. When the accuracy of the manipulation to the slide pattern is relatively low, the CPU may provide only an authority, which is an intermediate level between a level at which the user is permitted to have the complete authority and a level at which the user is not permitted to have the authority, to the user who performs the manipulation.

The connection determination unit may perform the processing of comparing the manipulation information and the travel information in consideration of an attitude of the portable terminal.

When the connection between the image forming device and the portable terminal is established, the CPU of the image forming device or the CPU of the portable terminal may identify the user who performs the manipulation input, and automatically call a specific function according to the identified user, and perform the function. In this case, the function that is the calling target corresponds previously to each user. For example, when the user authentication is performed, the user can be identified through the user authentication. Even if the user authentication is not performed, for example, the user may be identified by recognizing user's name recorded in the portable terminal. In this case, various functions can be performed. For example, transmission destination information corresponding to each user is previously registered in the image forming device, and assigned information can automatically be transmitted to the transmission destination information corresponding to the user when the user performs the connection establishing operation.

For example, at least one of the manipulation information on the image forming device and the travel information on the portable terminal is tentatively transmitted to the external server, and the connection determination unit may acquire the pieces of information through the server.

The image forming device may be any of a black-and-white or color copier, printer, facsimile machine, or a multi-function peripheral (MFP) as a combination thereof.

The portable type mobile terminal is not limited to the smartphone, but the portable type mobile terminal may be another type of mobile phone or a portable computer.

The connection control device of the invention can be applied to an image reading device (an example of the information processing device) that does not include the image forming unit and an image forming device that does not include the image reading device. Additionally, the connection control device can widely be applied to devices included in the wireless communication system, which includes the information control device and the portable type mobile terminal, as the device that establishes the connection between various information processing devices and the portable type mobile terminal.

The processes according to the above embodiments may be performed by software or by using a hardware circuit.

A program for executing the processes according to the above embodiments may be provided as well. The program may be recorded on a recording medium, such as a CD-ROM, flexible disk, hard disk, ROM, RAM, memory card, or the like, so as to be provided to the user. The program may also be downloaded to the device via a communication line such as the Internet. The processes described in conjunction with the flowcharts above are executed by a CPU and the like in accordance with the program.

According to the embodiments, the information on the position of the operation input performed to the information processing device by the user is compared to the information on the travel distance of the portable type mobile terminal. Whether the manipulation input performed by the user corresponds to the travel of the portable type mobile terminal is determined. The wireless connection between the information processing device and the portable type mobile terminal is established according to the determination result. Accordingly, the connection control device that can establish the connection between the two instruments to be able to conduct wireless communication by the simple manipulation, the information processing device, the image forming device, the portable type mobile terminal, and the information processing system can be provided.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A connection control device comprising:
a hardware processor configured to:
acquire information on a position in which a user performs manipulation input to an information processing device;
acquire information on a travel distance of a portable mobile terminal;
compare the information acquired by said hardware processor to determine whether the manipulation input performed by said user corresponds to a travel of said portable mobile terminal;

a connection unit for establishing a wireless connection between said information processing device and said portable mobile terminal according to a determination result of said hardware processor; and a manipulation image acquisition unit for acquiring a manipulation instruction image that guides the user in performing the manipulation input of a predetermined pattern, wherein the hardware processor acquires the information on the position in which the user performs manipulation input to the information processing device and the information on the travel distance of the portable mobile terminal while the manipulation instruction image acquired by said manipulation image acquisition unit is displayed on a display device provided in said information processing device.

2. The connection control device according to claim 1, wherein the hardware processor is further configured to authenticate the user who performs said manipulation input according to the determination result of said hardware processor.

3. The connection control device according to claim 1, wherein the hardware processor is further configured to:

acquire information on a position of said information processing device; and acquire information on a position of said portable mobile terminal, wherein said hardware processor makes said determination according to the information acquired by the hardware processor on the position of said information processing device and the information on the position of said portable mobile terminal.

4. The connection control device according to claim 1, wherein when said hardware processor acquires the information on the position in which a user performs manipulation input to the information processing device, the hardware processor acquires information on a clock time said user performs the manipulation input, when said hardware processor acquires the information on the travel distance of the portable mobile terminal, the hardware processor acquires information on a clock time said portable mobile terminal travels, and said hardware processor makes said determination according to the information on the clock time said user performs the manipulation input, and the information on the clock time said portable mobile terminal travels.

5. The connection control device according to claim 4, wherein said hardware processor considers that the clock time said user performs the manipulation input is identical to the clock time said portable mobile terminal travels, and makes said determination, when the clock time said user performs the manipulation input and the clock time said portable mobile terminal travels exist in a predetermined duration.

6. The connection control device according to claim 1, wherein said manipulation image acquisition unit acquires the manipulation instruction image that guides the user in performing the manipulation input of a pattern having complexity corresponding to the number of portable mobile terminals existing near said information processing device.

7. The connection control device according to claim 1, wherein said hardware processor is further configured to:

acquire the information on said position as two-dimensional positional information, and compare the acquired information to biaxial-direction information corresponding to the acquired two-dimensional positional information.

8. The connection control device according to claim 1, wherein said hardware processor is further configured to:

acquire a direction relating to the manipulation input of said user based on the acquired information, consider that a travel direction of said portable mobile terminal is identical to the direction relating to the manipulation input of said user at a time said user starts the manipulation input, detect an offset amount between the travel direction of said portable mobile terminal and the direction relating to the manipulation input of said user, and compare the information on the position in which the user performs manipulation input to the information processing device and the information on the travel distance of the portable mobile terminal according to the detected offset amount.

9. The connection control device according to claim 1, wherein the hardware processor is further configured to provide a manipulation authority of a function, in which a manipulation is prohibited before the wireless connection establishment in at least one of said information processing device and said portable mobile terminal, to the user when said connection unit establishes the wireless connection between said information processing device and said portable mobile terminal.

10. The connection control device according to claim 9, wherein said hardware processor is further configured to:

determine accuracy relating to the manipulation input performed by said user based on at least one of the information on the position in which the user performs manipulation input to the information processing device and the information on the travel distance of the portable mobile terminal, and restrict the authority provided to the user according to the determined accuracy relating to the manipulation input.

11. The connection control device according to claim 1, wherein at least one of said information on the position in which the user performs manipulation input to the information processing device and the information on the travel distance of the portable mobile terminal is acquired through an external server.

12. The connection control device according to claim 1, wherein the hardware processor is further configured to compare the information on the manipulation input and registration manipulation information, which is previously registered so as to correspond to predetermined processing of said information processing device, to provide an instruction to said information processing device to activate processing corresponding to the matched registration manipulation information, when said connection unit establishes the wireless connection between said information processing device and said portable mobile terminal.

13. The connection control device according to claim 1, wherein the hardware processor is further configured to:

identify the user who performs said manipulation input, and automatically call a specific function of said information processing device according to an identification result of the user, when said connection unit establishes the wireless connection between said information processing device and said portable mobile terminal.

14. The connection control device according to claim 1, wherein said hardware processor is further configured to acquire information on a position, in which the user performs the manipulation input, on a touch panel provided in said information processing device.

15. The connection control device according to claim 1, wherein said hardware processor is further configured to acquire the information on said position based on an image captured by an imaging device that captures motion of the user.

16. An information processing device comprising:
the connection control device according to claim 1; and
a communication unit for conducting wireless communication with said portable mobile terminal when said connection unit establishes the wireless connection to said portable mobile terminal.

17. An image forming device comprising the information processing device according to claim 16; and an image forming unit for forming an image on a sheet.

18. The image forming device according to claim 17, further comprising a printer for performing print using said image forming unit based on print information of the user who performs said manipulation input when said connection unit establishes the wireless connection between said information processing device and said portable mobile terminal.

19. A portable mobile terminal comprising:
the connection control device according to claim 1; and
a communication unit for conducting wireless communication with said information processing device when said connection unit establishes the wireless connection to said information processing device.

20. An information processing system comprising:
an information processing device; and
a portable mobile terminal, wherein
one of said information processing device and said portable mobile terminal includes the connection control device according to claim 1, and
said connection unit establishes the wireless connection between said information processing device and said portable mobile terminal.

21. An information processing system comprising:
an information processing device;
a portable mobile terminal; and
a server configured to conduct communication with each of said information processing device and said portable mobile terminal, wherein
said server includes the connection control device according to claim 1, and
said connection unit establishes the wireless connection between said information processing device and said portable mobile terminal.

22. The connection control device according to claim 1, wherein the information on the position in which the user performs manipulation input to the information processing device describes the position on the information processing device where the user performs the manipulation input.

23. A method for controlling a connection control device, comprising:
a first acquiring step of acquiring information on a position in which a user performs manipulation input to an information processing device;
a second acquiring step of acquiring information on a travel distance of a portable mobile terminal;
a determination step of comparing the information acquired in said first acquisition step and the information acquired in said second acquisition step to determine whether the manipulation input performed by said user corresponds to a travel of said portable mobile terminal;

a connection step of establishing a wireless connection between said information processing device and said portable mobile terminal according to a determination result of said determination step; and
an acquiring step of acquiring a manipulation instruction image that guides the user in performing the manipulation input of a predetermined pattern, wherein
the information on the position in which the user performs manipulation input to the information processing device and the information on the travel distance of the portable mobile terminal is acquired while the manipulation instruction image is displayed on a display device provided in said information processing device.

24. The method for controlling a connection control device according to claim 23,
wherein said manipulation instruction image that guides the user in performing the manipulation input of a pattern having complexity corresponding to the number of portable mobile terminals existing near said information processing device.

25. The method for controlling a connection control device according to claim 23, further comprising:
providing a manipulation authority of a function, in which a manipulation is prohibited before the wireless connection establishment in at least one of said information processing device and said portable mobile terminal, to the user when said connection unit establishes the wireless connection between said information processing device and said portable mobile terminal;
determining accuracy relating to the manipulation input performed by said user based on at least one of the information on the position in which the user performs manipulation input to the information processing device and the information on the travel distance of the portable mobile terminal, and
restricting the authority provided to the user according to the determined accuracy relating to the manipulation input.

26. The method for controlling a connection control device according to claim 23, further comprising comparing the information on the manipulation input and registration manipulation information, which is previously registered so as to correspond to predetermined processing of said information processing device, to provide an instruction to said information processing device to activate processing corresponding to the matched registration manipulation information, when a wireless connection is established between said information processing device and said portable mobile terminal.

27. The method for controlling a connection control device according to claim 23, further comprising:
identifying the user who performs said manipulation input, and
automatically calling a specific function of said information processing device according to an identification result of the user, when said connection unit establishes the wireless connection between said information processing device and said portable mobile terminal.

28. A non-transitory computer-readable recording medium encoded with a program for controlling a connection control device, the program causing a computer to execute processing comprising:
a first acquiring step of acquiring information on a position in which a user performs manipulation input to an information processing device;
a second acquiring step of acquiring information on a travel distance of a portable mobile terminal;

a determination step of comparing the information acquired in said first acquisition step and the information acquired in said second acquisition step to determine whether the manipulation input performed by said user corresponds to a travel of said portable mobile terminal;

a connection step of establishing a wireless connection between said information processing device and said portable mobile terminal according to a determination result of said determination step an acquiring step of acquiring a manipulation instruction image that guides the user in performing the manipulation input of a predetermined pattern, wherein the information on the position in which the user performs manipulation input to the information processing device and the information on the travel distance of the portable mobile terminal is acquired while the manipulation instruction image is displayed on a display device provided in said information processing device.

29. The non-transitory computer-readable recording medium encoded with a program for controlling a connection control device according to claim 28, wherein said manipulation instruction image that guides the user in performing the manipulation input of a pattern having complexity corresponding to the number of portable mobile terminals existing near said information processing device.

30. The non-transitory computer-readable recording medium encoded with a program for controlling a connection control device according to claim 28, the processing further comprising:

providing a manipulation authority of a function, in which a manipulation is prohibited before the wireless connection establishment in at least one of said information processing device and said portable mobile terminal, to the user when said connection unit establishes the wireless connection between said information processing device and said portable mobile terminal;

determining accuracy relating to the manipulation input performed by said user based on at least one of the information on the position in which the user performs manipulation input to the information processing device and the information on the travel distance of the portable mobile terminal, and restricting the authority provided to the user according to the determined accuracy relating to the manipulation input.

31. The non-transitory computer-readable recording medium encoded with a program for controlling a connection control device according to claim 28, the processing further comprising comparing the information on the manipulation input and registration manipulation information, which is previously registered so as to correspond to predetermined processing of said information processing device, to provide an instruction to said information processing device to activate processing corresponding to the matched registration manipulation information, when a wireless connection is established between said information processing device and said portable mobile terminal.

32. The non-transitory computer-readable recording medium encoded with a program for controlling a connection control device according to claim 28, the processing further comprising:

identifying the user who performs said manipulation input, and automatically calling a specific function of said information processing device according to an identification result of the user, when said connection unit establishes the wireless connection between said information processing device and said portable mobile terminal.

* * * * *